(12) United States Patent
Egilmez et al.

(10) Patent No.: US 11,457,229 B2
(45) Date of Patent: Sep. 27, 2022

(54) LFNST SIGNALING FOR CHROMA BASED ON CHROMA TRANSFORM SKIP

(71) Applicant: QUALCOMM Incorporated, San Diego, CA (US)

(72) Inventors: Hilmi Enes Egilmez, San Diego, CA (US); Alican Nalci, San Diego, CA (US); Muhammed Zeyd Coban, Carlsbad, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/128,898

(22) Filed: Dec. 21, 2020

(65) Prior Publication Data

US 2021/0195222 A1 Jun. 24, 2021

Related U.S. Application Data

(60) Provisional application No. 62/959,692, filed on Jan. 10, 2020, provisional application No. 62/953,126, filed on Dec. 23, 2019.

(51) Int. Cl.
*H04N 19/186* (2014.01)
*H04N 19/176* (2014.01)
*H04N 19/64* (2014.01)

(52) U.S. Cl.
CPC ......... *H04N 19/186* (2014.11); *H04N 19/176* (2014.11); *H04N 19/647* (2014.11)

(58) Field of Classification Search
CPC ... H04N 19/186; H04N 19/176; H04N 19/647
See application file for complete search history.

(56) References Cited

U.S. PATENT DOCUMENTS

| 10,306,229 | B2 | 5/2019 | Zhao et al. | |
|---|---|---|---|---|
| 10,448,053 | B2 | 10/2019 | Said et al. | |
| 10,491,922 | B2 | 11/2019 | Zhao et al. | |
| 10,972,733 | B2 | 4/2021 | Zhao et al. | |
| 10,986,340 | B2 | 4/2021 | Egilmez et al. | |
| 2019/0387241 | A1* | 12/2019 | Kim | H04N 19/44 |

(Continued)

OTHER PUBLICATIONS

Bossen F., et al., "JVET Common Test Conditions and Software Reference Configurations for SDR Video", Joint Video Experts Team (JVET) of ITU-T SG 16 WP 3 and ISO/IEC JTC 1/SC 29/WG 11, 14th Meeting, Geneva, CH, Mar. 19-27, 2019, JVET-N1010-v1, pp. 1-6.

(Continued)

*Primary Examiner* — Zhubing Ren
(74) *Attorney, Agent, or Firm* — Shumaker & Sieffert, P.A.

(57) ABSTRACT

An example device includes memory configured to store video data and one or more processors implemented in circuitry and coupled to the memory. The one or more processors determine whether a chroma block of the video data is encoded using dual tree partitioning. The one or more processors determine whether transform skip mode for the chroma block is enabled. The one or more processors, based on the chroma block being encoded using dual tree partitioning and transform skip mode being enabled for the chroma block, infer a value of a low-frequency non-separable transform (LFNST) index for the chroma block.

38 Claims, 8 Drawing Sheets

(56) References Cited

U.S. PATENT DOCUMENTS

| | | | | |
|---|---|---|---|---|
| 2020/0260070 | A1* | 8/2020 | Yoo | H04N 19/103 |
| 2020/0304782 | A1* | 9/2020 | Zhao | H04N 19/593 |
| 2020/0359019 | A1* | 11/2020 | Koo | H04N 19/60 |
| 2020/0366937 | A1 | 11/2020 | Egilmez et al. | |
| 2020/0389671 | A1* | 12/2020 | Zhao | H04N 19/159 |
| 2021/0076070 | A1* | 3/2021 | Jung | H04N 19/12 |
| 2021/0099702 | A1 | 4/2021 | Egilmez et al. | |

OTHER PUBLICATIONS

Bross B., et al., "Versatile Video Coding (Draft 10)", JVET-S2001-vH, Joint Video Experts Team (JVET) of ITU-T SG 16 WP 3 and ISO/IEC JTC 1/SC 29/WG 11, 19th Meeting: by teleconference, Jun. 22-Jul. 1, 2020, 551 Pages.

Bross B., et al., "Versatile Video Coding (Draft 3)", Joint Video Experts Team (JVET) of ITU-T SG 16 WP 3 and ISO/IEC JTC 1/SC 29/WG 11, 12th Meeting: Macao, CN, JVET-L1001-v9, Oct. 3-12, 2018, 235 pages.

Bross B., et al., "Versatile Video Coding (Draft 7)", 16th JVET Meeting, Oct. 1, 2019-Oct. 11, 2019, Geneva, (The Joint Video Exploration Team of ISO/IEC JTC1/SC29/WG11 and ITU-T SG. 16 WP 3), No. JVET-P2001-vE, Nov. 12, 2019 (Nov. 12, 2019), XP030224328, 494 pages, Retrieved from the Internet: URL: http://phenix.int-evry.fr/jvet/doc_end_user/documents/16_Geneva/wg11/JVET-P2001-v14.zip JVET-P2001-vC.docx , [retrieved on Nov. 12, 2019], paragraphs [9.3.3.2], [9.3.3.6], [9.3.3.14], table 124.

Chen J., et al., "Algorithm Description for Versatile Video Coding and Test Model 3 (VTM 3)," 12th JVET Meeting, Oct. 3, 2018-Oct. 12, 2018, Macao, (The Joint Video Exploration Team of ISO/IEC JTC1/SC29/WG11 and ITU-T SG.16 WP 3), No. JVET-L1002-v1, Dec. 24, 2018 (Dec. 24, 2018), XP030251962, pp. 1-48, Retrieved from the Internet: URL: http://phenix.int-evry.fr/jvet/doc_end_user/documents/12_Macao/wg11/JVET-L1002-v2.zip JVET-L1002-v2.docx [retrieved on Dec. 24, 2018].

Chen J., et al., "Algorithm Description of Joint Exploration Test Model 7 (JEM7)", JVET-G1001-V1, Joint Video exploration Team (JVET) of ITU-T SG 16 WP3 and ISO/IEC JTC 1/SC 29/WG 11, 7th Meeting, Jul. 13, 2017-Jul. 21, 2017, Torino, Aug. 19, 2017 (Aug. 19, 2017), XP030150980, 48 Pages, pp. i-iv, Retrieved from the Internet: URL: http://phenix.int-evry.fr/jvet/doc_end_user/documents/7_Torino/wg11/JVET-G0001-v1.zip.

Egilmez H.E, et al., "Combination of JVET-Q0106, JVET-0686 and JVET-Q0133 for LFNST Signaling, Latency Reduction and Scaling Process", JVET-Q0784-v5, Joint Video Experts Team (JVET) of ITU-T SG 16 WP 3 and ISO/IEC JTC 1/SC 29/WG 11, 17th Meeting, Brussels, BE, Jan. 7-17, 2020, pp. 1-6.

Egilmez (Qualcomm) H.E., et al., "Chroma LFNST Simplification and Signaling", 17th JVET Meeting, Jan. 7, 2020-Jan. 17, 2020, Brussels, (The Joint Video Exploration Team of ISO/IEC JTC1/SC29/WG11 and ITU-T SG.16 WP3), No. JVET-Q0686-v1, Jan. 8, 2020 (Jan. 8, 2020), XP030224053, 4 pages, Retrieved from the Internet: URL: http://phenix.int-evry.fr/jvet/doc_end_user/documents/17_Brussels/wg11/JVET-Q0686-v1.zip JVET-Q0686_v1.docx [retrieved on Jan. 8, 2020] the whole document.

Egilmez (Qualcomm) H.E., et al., "LFNST Signaling for Chroma based on Chroma Transform Skip Flags", 17th JVET Meeting, Jan. 7, 2020-Jan. 17, 2020, Brussels, (The Joint Video Exploration Team of ISO/IEC JTC1/SC29/WG11 and ITU-TSG.16 WP3), No. JVET-Q0103-v1, m51692, Dec. 26, 2019 (Dec. 26, 2019), XP030222578, pp. 1-4, Retrieved from the Internet:URL:http://phenix.int-evry.fr/jvet/doc_enduser/documents/17_Brussels/wg11/JVET-Q0103-v1.zip JVET-Q0103_v1.docx [retrieved on Dec. 26, 2019] the whole document.

Hashimoto T., et al., "Fix on LFNST Condition", JVET-Q0133, Joint Video Experts Team (JVET) of ITU-T SG 16 WP 3 and ISO/IEC JTC 1/SC 29/WG 11, 17th Meeting, Brussels, BE, Jan. 7-17, 2020, pp. 1-5.

Heng B., et al., "AHG16: Combination of LFNST with Transform Skip", JVET-Q0106-v1, Joint Video Experts Team (JVET) of ITU-T SG 16 WP 3 and ISO/IEC JTC 1/SC 29/WG 11, 17th Meeting, Brussels, BE, Jan. 7-17, 2020, pp. 1-4.

International Search Report and Written Opinion—PCT/US2020/066649—ISA/EPO—dated Apr. 1, 2021, 12 pp.

ITU-T H.265, Series H: Audiovisual and Multimedia Systems, Infrastructure of Audiovisual Services—Coding of Moving Video, High Efficiency Video Coding, The International Telecommunication Union, Jun. 2019, 696 Pages.

Koo (LGE) M, et al., "CE6: Reduced Secondary Transform (RST) (Test 6.5.1)", 13th JVET Meeting, Jan. 9, 2019-Jan. 18, 2019, Marrakech, (The Joint Video Exploration Team of ISO/IEC JTC1/SC29/WG11 and ITU-TSG.16 WP 3), No. JVET-M0292, Jan. 12, 2019 (Jan. 12, 2019), XP030201760, pp. 1-14, Retrieved from the Internet: URL:http://phenix.int-evry.fr/jvet/doc_end_user/documents/13_Marrakech/wg11/JVET-M0292-v5.zip RST M0292.pptx [retrieved on Jan. 12, 2019] the Whole Document.

* cited by examiner

LFNST SIGNALING FOR CHROMA BASED ON CHROMA TRANSFORM SKIP

This application claims priority to U.S. Provisional Application No. 62/953,126, filed on Dec. 23, 2019, and U.S. Provisional Application No. 62/959,692, filed on Jan. 10, 2020, the entire content of both of which is incorporated by reference herein.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for video coding and more specifically to encoding and decoding syntax elements for transform coding, which is a fundamental element of all modern video compression standards. This disclosure describes transform signaling techniques that can be used in a video codec to specify and/or determine a transform from among multiple transform candidates for encoding and decoding.

In one example, a method includes determining whether a chroma block of the video data is encoded using dual tree partitioning, determining whether transform skip mode for the chroma block is enabled, based on the chroma block being encoded using dual tree partitioning and the transform skip mode being enabled for the chroma block, inferring a value of a low-frequency non-separable transform (LFNST) index for the chroma block, and decoding the chroma block without applying an inverse LFNST.

In another example, a device includes memory configured to store the video data; and one or more processors implemented in circuitry and being coupled to the memory, the one or more processors being configured to: determine whether a chroma block of the video data is encoded using dual tree partitioning; determine whether transform skip mode for the chroma block is enabled; based on the chroma block being encoded using dual tree partitioning and transform skip mode being enabled for the chroma block, infer a value of a low-frequency non-separable transform (LFNST) index for the chroma block; and decode the chroma block without applying an inverse LFNST. In another example, a non-transitory computer-readable storage medium storing instructions that, when executed, causes one or more processors to: determine whether a chroma block of the video data is encoded using dual tree partitioning; determine whether transform skip mode for the chroma block is enabled; based on the chroma block being encoded using dual tree partitioning and transform skip mode being enabled for the chroma block, inferring a value of a low-frequency non-separable transform (LFNST) index for the chroma block; and decode the chroma block without applying an inverse LFNST.

In another example, a device includes means for determining whether a chroma block of the video data is encoded using dual tree partitioning, means for determining whether transform skip mode for the chroma block is enabled, means for inferring a value of a low-frequency non-separable transform (LFNST) index for the chroma block based on the chroma block being encoded using dual tree partitioning and transform skip mode being enabled for the chroma block, and means for decoding the chroma block without applying an inverse LFNST.

In one example, a method includes determining whether to encode a chroma block of the video data using dual tree partitioning, determining whether to enable transform skip mode for the chroma block, based on the determination to encode the chroma block using dual tree partitioning and the determination to enable transform skip mode for the chroma block, refraining from signaling a low-frequency non-separable transform (LFNST) index for the chroma block, and encoding the chroma block without applying an LFNST.

In another example, a device includes memory configured to store video data and one or more processors implemented in circuitry and being coupled to the memory, the one or more processors being configured to: determine whether to encode a chroma block of the video data using dual tree partitioning; determine whether to enable transform skip mode for the chroma block; based on the determination to encode the chroma block using dual tree partitioning and the determination to enable transform skip mode for the chroma block, refrain from signaling a low-frequency non-separable transform (LFNST) index for the chroma block; and encode the chroma block without applying an LFNST.

In another example, a non-transitory computer-readable storage medium storing instructions that, when executed, causes one or more processors to: determine whether to encode a chroma block of the video data using dual tree partitioning; determine whether to enable transform skip mode for the chroma block; based on the determination to encode the chroma block using dual tree partitioning and the determination to enable transform skip mode for the chroma block, refrain from signaling a low-frequency non-separable transform (LFNST) index for the chroma block; and encode the chroma block without applying an LFNST.

In another example, a device includes means for determining whether to encode a chroma block of the video data using dual tree partitioning, means for determining whether to enable transform skip mode for the chroma block, means for refraining from signaling a low-frequency non-separable transform (LFNST) index for the chroma block based on the determination to encode the chroma block using dual tree partitioning and the determination to enable transform skip mode for the chroma block, and means for encoding the chroma block without applying an LFNST.

The details of one or more examples are set forth in the accompanying drawings and the description below. Other features, objects, and advantages will be apparent from the description, drawings, and examples.

DETAILED DESCRIPTION

In some video coding standards, low frequency non-separable transform (LFNST) signaling for chroma blocks depends on a luma transform skip flag. For example, an LFNST index may only be signaled for a chroma block if a luma transform skip flag is of a certain value. The dependence of LFNST signaling for chroma blocks on the luma transform skip flag may not be desirable, especially for chroma blocks coded in a separate tree partition (e.g., when luma and chroma channels are coded using separate tree-based partitions, such as dual tree partitions). Having LFNST signaling for chroma blocks depend on the luma transform skip flag may increase decoding latency when compared to situations where LFNST signaling for chroma does not depend on the luma transform skip flag. Additionally, signaling an LFNST index when an LFNST is not used may increase signaling overhead. According to the techniques of this disclosure, LFNST signaling for chroma may not depend on a luma transform skip flag and LFNST indexes may not be signaled when LFNSTs are not used, thereby improving decoding latency and reducing signaling overhead.

Figure 1:
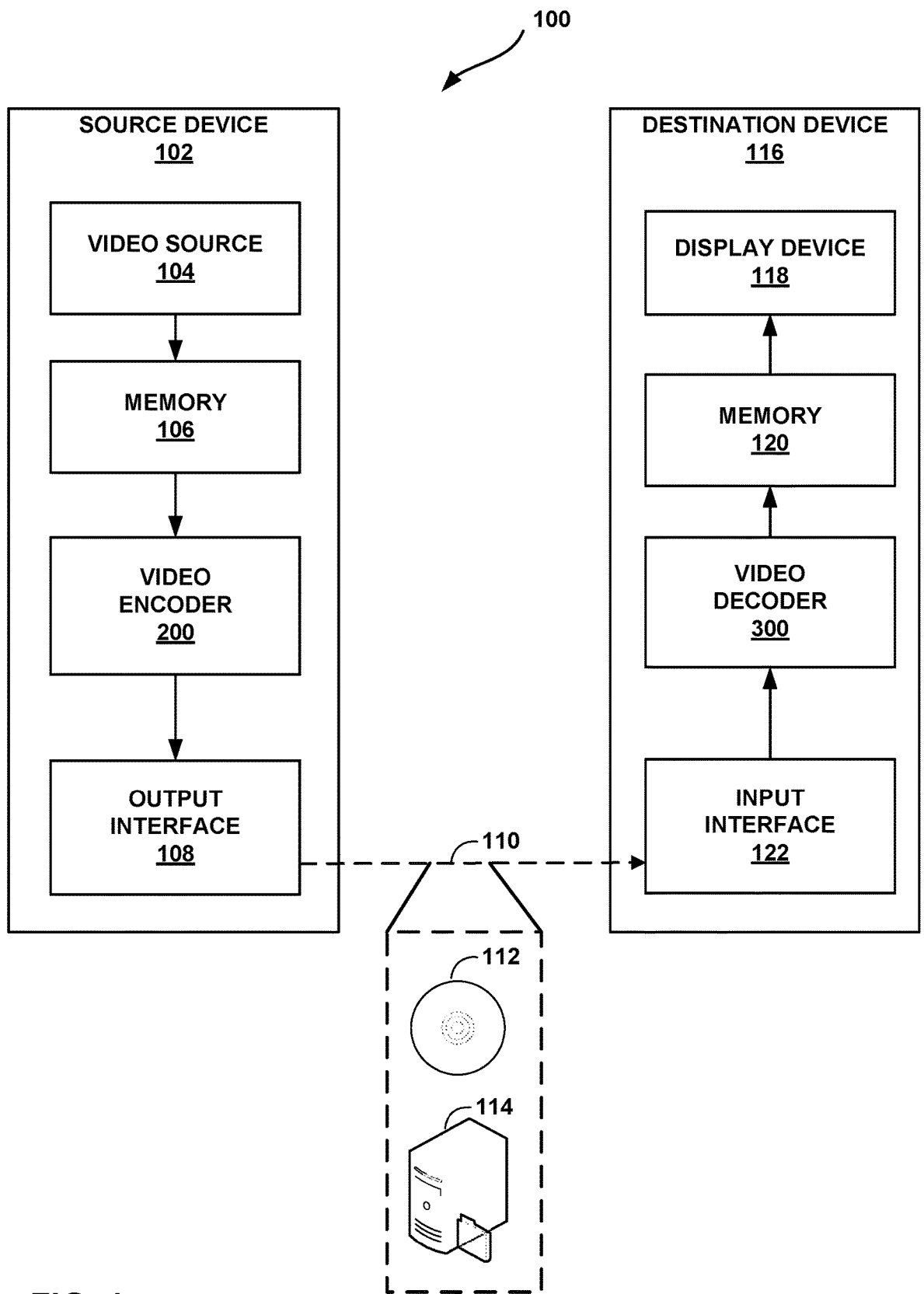
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, video encoding and decoding system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as mobile handsets, smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for encoding and decoding syntax elements for transform coding. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

Video encoding and decoding system 100 as shown in FIG. 1 is merely one example. In general, any digital video encoding and/or decoding device may perform techniques for encoding and decoding syntax elements for transform coding. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, video encoding and decoding system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memory 106 and memory 120 may store raw video data, e.g., raw video from video source 104 and raw, decoded video data from video decoder 300. Additionally or alternatively, memory 106 and memory 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memory 106 and memory 120 may store encoded video data, e.g., output from video encoder 200 and input to video decoder 300. In some examples, portions of memory 106 and memory 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). A draft of the VVC standard is described in Bross, et al. "Versatile Video Coding (Draft 7)," Joint Video Experts Team (JVET) of ITU-T SG 16 WP 3 and ISO/IEC JTC 1/SC 29/WG 11, 16$^{th}$ Meeting: Geneva, CH, 1-11 Oct. 2019, JVET-P2001-v14 (hereinafter "VVC Draft 7"). A more recent draft of the VVC standard is described in Bross, et al. "Versatile Video Coding (Draft 10)," Joint Video Experts Team (WET) of ITU-T SG 16 WP 3 and ISO/IEC JTC 1/SC 29/WG 11, 19$^{th}$ Meeting: by Teleconference, 22 Jun. 1-Jul. 2020, JVET-S2001-v17 (hereinafter "VVC Draft 10"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as an LFNST, a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. In some examples, video decoder 300 may apply an inverse secondary transform, such as an inverse LFNST. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In accordance with the techniques of this disclosure, as will be explained in more detail below, a method includes determining whether a chroma block of the video data is encoded using dual tree partitioning, determining whether transform skip mode for the chroma block is enabled, based on the chroma block being encoded using dual tree partitioning and the transform skip mode being enabled for the chroma block, inferring a value of a low-frequency non-separable transform (LFNST) index for the chroma block, and decoding the chroma block without applying an inverse LFNST.

In another example of the disclosure, a device includes memory configured to store video data and one or more processors implemented in circuitry and being coupled to the memory, the one or more processors being configured to: determine whether a chroma block of the video data is encoded using dual tree partitioning; determine whether transform skip mode for the chroma block is enabled; based on the chroma block being encoded using dual tree partitioning and transform skip mode being enabled for the chroma block, infer a value of a low-frequency non-separable transform (LFNST) index for the chroma block; and decode the chroma block without applying an inverse LFNST.

In another example of the disclosure, a non-transitory computer-readable storage medium storing instructions that, when executed, causes one or more processors to: determine whether a chroma block of the video data is encoded using dual tree partitioning; determine whether transform skip mode for the chroma block is enabled; based on the chroma block being encoded using dual tree partitioning and transform skip mode being enabled for the chroma block, inferring a value of a low-frequency non-separable transform (LFNST) index for the chroma block; and decode the chroma block without applying an inverse LFNST.

In another example of the disclosure, a device includes means for determining whether a chroma block of the video data is encoded using dual tree partitioning, means for determining whether transform skip mode for the chroma block is enabled, means for inferring a value of a low-frequency non-separable transform (LFNST) index for the chroma block based on the chroma block being encoded using dual tree partitioning and transform skip mode being enabled for the chroma block, and means for decoding the chroma block without applying an inverse LFNST.

In another example of the disclosure, a method includes determining whether to encode a chroma block of the video data using dual tree partitioning, determining whether to enable transform skip mode for the chroma block, based on the determination to encode the chroma block using dual tree partitioning and the determination to enable transform skip mode for the chroma block, refraining from signaling a low-frequency non-separable transform (LFNST) index for the chroma block, and encoding the chroma block without applying an LFNST.

In another example of the disclosure, a device includes memory configured to store video data and one or more processors implemented in circuitry and being coupled to the memory, the one or more processors being configured to: determine whether to encode a chroma block of the video data using dual tree partitioning; determine whether to enable transform skip mode for the chroma block; based on the determination to encode the chroma block using dual tree partitioning and the determination to enable transform skip mode for the chroma block, refrain from signaling a low-frequency non-separable transform (LFNST) index for the chroma block; and encode the chroma block without applying an LFNST.

In another example of the disclosure, a non-transitory computer-readable storage medium storing instructions that, when executed, causes one or more processors to: determine whether to encode a chroma block of the video data using dual tree partitioning; determine whether to enable transform skip mode for the chroma block; based on the determination to encode the chroma block using dual tree partitioning and the determination to enable transform skip mode for the chroma block, refrain from signaling a low-frequency non-separable transform (LFNST) index for the chroma block; and encode the chroma block without applying an LFNST.

In another example of the disclosure, a device includes means for determining whether to encode a chroma block of the video data using dual tree partitioning, means for determining whether to enable transform skip mode for the chroma block, means for refraining from signaling a low-frequency non-separable transform (LFNST) index for the chroma block based on the determination to encode the chroma block using dual tree partitioning and the determination to enable transform skip mode for the chroma block, and means for encoding the chroma block without applying an LFNST.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
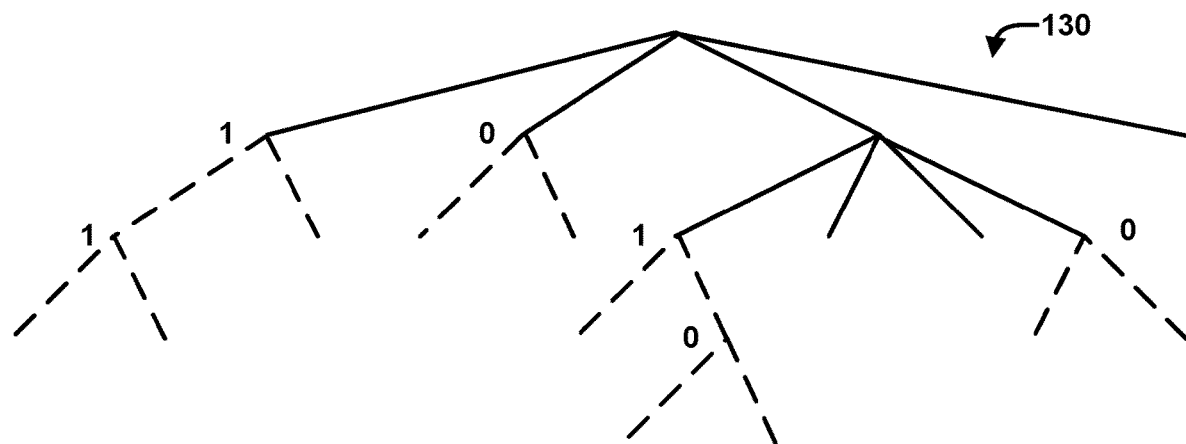
FIGS. 2A and 2B are conceptual diagrams illustrating an example quadtree binary tree (QTBT) structure, and a corresponding coding tree unit (CTU).
Figure 2B:
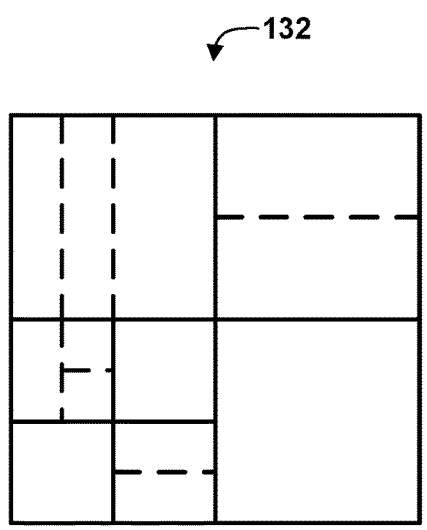

FIGS. 2A and 2B are conceptual diagrams illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, because quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, the leaf quadtree node will not be further split by the binary tree, because the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has a width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

One type of partitioning is single tree partitioning. In single tree partitioning, a luma block of video data and the two corresponding chroma blocks (Cb and Cr) are partitioned in the same manner. For example, when video encoder 200 splits a luma block, video encoder 200 applies the same split to the corresponding chroma blocks. Another type of partition is a separate tree partitioning, such as a dual tree partitioning. With dual tree partitioning, video encoder 200 may partition a luma block differently than the corresponding chroma blocks. For example, video encoder 200 may apply a split to a luma block and not apply the same split to the corresponding chroma blocks.

Figure 3:
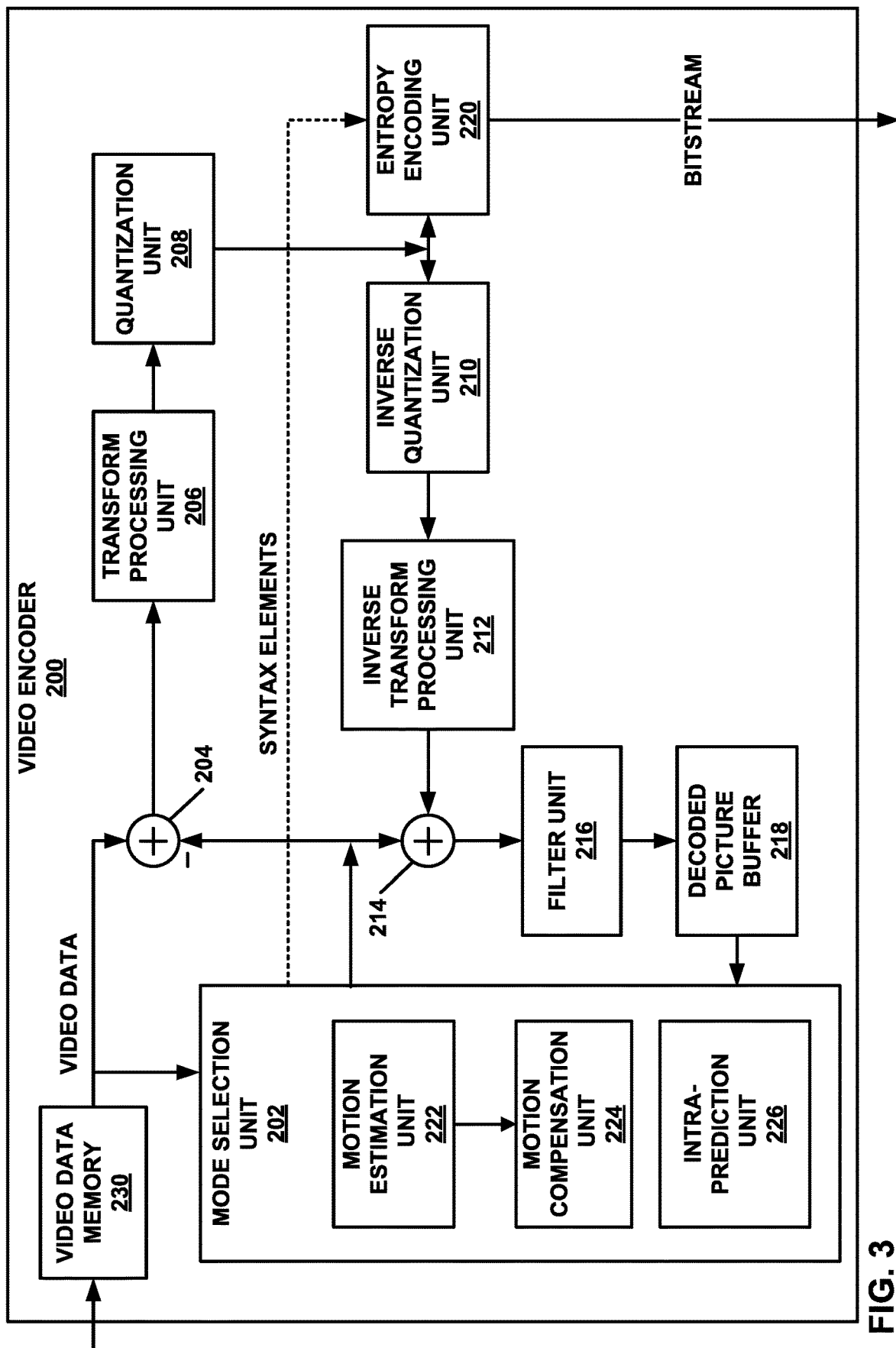
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, of FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered.

Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform or an LFNST. In some examples, transform processing unit 206 may, based on video encoder 200 determining to encode a chroma block of the video data using dual tree partitioning and determining to enable transform skip mode for the chroma block, not apply an LFNST to the chroma block. In some examples, transform processing unit 206 does not apply transforms to a residual block. For example, transform processing unit 206 may not apply a transform to a residual block (e.g., a luma block or a chroma block) when video encoder generates a transform skip flag for the residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion)

based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured determine whether to encode a chroma block of the video data using dual tree partitioning, determine whether to enable transform skip mode for the chroma block, based on the determination to encode the chroma block using dual tree partitioning and the determination to enable transform skip mode for the chroma block, refrain from signaling a low-frequency non-separable transform (LFNST) index for the chroma block, and encode the chroma block without applying an LFNST.

Figure 4:
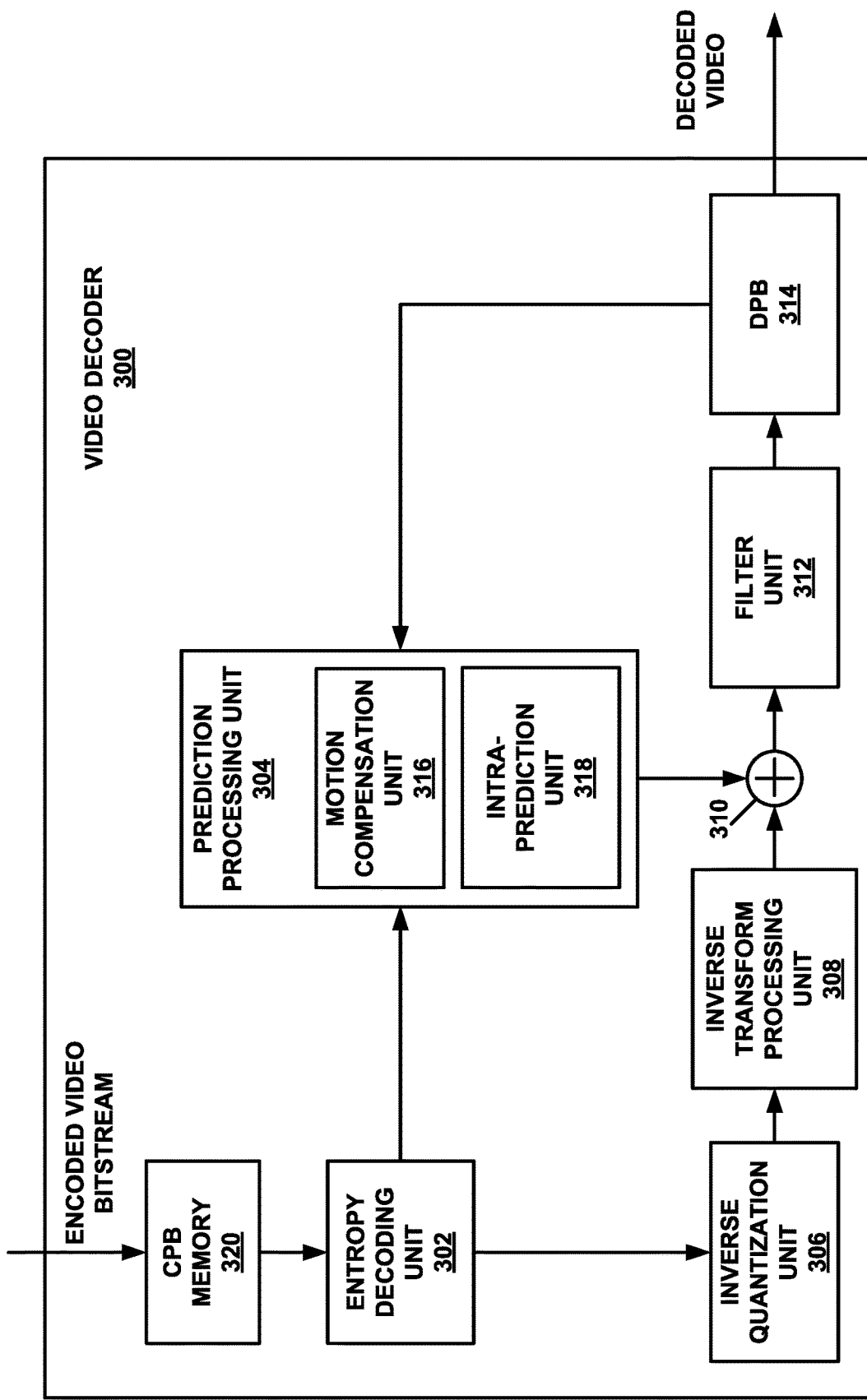
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 according to the techniques of VVC and HEVC. However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, of FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse LFNST, an inverse rotational transform, an inverse directional transform, or another inverse transform to the transform coefficient block. In some examples, inverse transform processing unit 308 may, based on video decoder 300 determining that a chroma block was encoded using dual tree partitioning and that transform skip mode is enabled for the chroma block, not apply an inverse LFNST to the chroma block. In some examples, when a transform skip flag for a block (e.g., a luma block or a chroma block) is enabled, inverse transform processing unit 308 may not apply an inverse transform to the block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

Video decoder 300 represents an example of a video decoding device including a memory configured to store video data, and one or more processing units implemented in circuitry and configured to determine whether a chroma block of the video data is encoded using dual tree partitioning, determine whether transform skip mode for the chroma block is enabled, based on the chroma block being encoded using dual tree partitioning and transform skip mode being enabled for the chroma block, infer a value of a low-frequency non-separable transform (LFNST) index for the chroma block, and decode the chroma block without applying an inverse LFNST.

As described above, example techniques of this disclosure are related to transform coding, which is typically a fundamental element of modern video compression standards. This disclosure describes techniques for encoding and decoding syntax elements for transform coding that may be used by a video codec (such as video encoder 200 or video decoder 300) to specify and/or determine the transform selected among multiple transform candidates for encoding/decoding. Since the techniques of this disclosure aim to reduce the signaling overhead based on available side information, such as intra mode, the techniques of this disclosure may improve coding efficiency and may be used in advanced video codecs, including extensions of HEVC and VVC Draft 7.

In VVC draft 7, the low frequency non-separable transform (LFNST) signaling for chroma blocks depends on the luma transform skip flag. The dependence of LFNST signaling for chroma blocks on the luma transform skip flag may not be desirable, especially for chroma blocks coded in a separate tree partition (e.g., when luma and chroma channels are coded using separate tree-based partitions).

In VVC draft 7, an LFNST index (e.g., an index representative of which LFNST transform may be applied) is signaled if the following set of conditions are satisfied:

```
LfnstDcOnly = 1
LfnstZeroOutSigCoeffFlag = 1
MtsZeroOutSigCoeffFlag = 1
transform_tree( x0, y0, cbWidth, cbHeight, treeType, chType )
  lfnstWidth      =   (   treeType          = =
DUAL_TREE_CHROMA          ) ? cbWidth / Sub WidthC
    : (    ( IntraSubPartitionsSplitType    = =
ISP_VER_SPLIT      ) ? cbWidth              /
       NumIntraSubPartitions : cbWidth )
  lfnstHeight      =   (   treeType         = =
DUAL_TREE_CHROMA          ) ? cbHeight / SubHeightC
    : (    ( IntraSubPartitionsSplitType    = =
ISP_HOR_SPLIT) ? cbHeight                   /
       NumIntraSubPartitions : cbHeight )
  if( Min( lfnstWidth, lfnstHeight ) >= 4 && sps_lfnst_enabled_
    flag = =
1                                           &&
    CuPredMode[ chType ][ x0 ][ y0 ] = = MODE INTRA &&
    transform_skip_flag[ x0 ][ y0 ][ 0 ]   = =   0   &&
    ( treeType    !=    DUAL_TREE_CHROMA         ||
!intra_mip_flag[ x0 ][ y0 ]                      ||
      Min( lfnstWidth, lfnstHeight )    >=   16   )    &&
    Max( cbWidth, cbHeight ) <= MaxTbSizeY) {
      if( ( IntraSubPartitionsSplitType != ISP_NO_SPLIT ||
        LfnstDcOnly
= =           0             )               &&
        LfnstZeroOutSigCoeffFlag = = 1 )
        lfnst_idx                                  ae(v)
  }
``` where the transform_skip_flag[x0][y0][0]==0 (e.g., the transform skip flag is 0 indicating that the transform skip mode is not being applied) is one of the conditions on which video encoder 200 may determine whether to signal lfnst_idx or not. For example, according to VVC Draft 7, video encoder 200 may determine whether or not to signal lfnst_idx based on transform skip for the luma component (e.g., transform_skip_flag[x0][y0][cIdx] for cIdx=0).

This disclosure describes several techniques for encoding and decoding of syntax elements for transform coding that may be used in VVC or other video coding standards.

The techniques of this disclosure set forth different LFNST index signaling when chroma blocks are coded in a separate tree mode from luma blocks. Specifically, this disclosure describes LFNST signaling designs that may be defined based on combinations of the following set of rules. Video encoder 200 may apply any of these rules to determine when to signal an LFNST index, and video decoder 300 may apply any of these rules to determine when to parse the LFNST index or when to infer the LFNST flag to be a particular value (e.g., zero).

In some examples, if separate tree (e.g., dual tree) partitions are used for luma and chroma channels, the following rules may apply:

1) Video encoder 200 may generate and signal an LFNST index and apply an LFNST for a luma channel if the transform skip flag for the luma component, transform_skip_ flag[x0][y0][0], is disabled (e.g., is 0 indicating the transform skip mode is not being used). Video encoder 200 may not signal the LFNST index (or flag) or apply an LFNST and video decoder 300 may infer the LFNST index (or flag) to be 0 and not apply an inverse LFNST if the transform skip flag for luma is enabled; and 2) Video encoder 200 may generate and signal an LFNST index and apply an LFNST for a chroma channel if at least one of the transform skip flags (transform_skip_flag[x0][y0][1] and transform_skip_flag[x0][y0][2]) for both chroma components, Cb and Cr, is disabled (e.g., is 0 indicating the transform skip mode is not being used). In this case, video decoder 300 may parse the LFNST index and apply an inverse LFNST. In other words, video encoder 200 may not signal the LFNST index (or flag) or apply the LFNST and video decoder 300 may infer the LFNST index (or flag) to be 0 and not apply an inverse LFNST if both Cb and Cr transform skip flags are enabled (e.g., both transform_skip_flag[x0][y0][1] and transform_skip_flag[x0][y0][2] are equal to 1).

In some examples, if single tree partitioning is used for both the luma and the chroma channels, the following rule may be applied. Video encoder 200 may generate and signal an LFNST index and apply an LFNST for both the luma and the chroma channels, if the transform skip flag for the luma component, transform_skip_flag[x0][y0][0], is disabled. Video encoder 200 may not signal an LFNST index (or flag) or apply an LFNST and video decoder 300 may infer the LFNST index (or flag) to be 0 and not apply an inverse LFNST if the transform skip flag for luma is enabled.

In some examples, if single tree partitioning is used for both the luma and the chroma channels, the following rule may be applied. Video encoder 200 may generate and signal an LFNST index and apply an LFNST for both the luma and the chroma channels, if at least one of the transform skip flags (transform_skip_flag[x0][y0][0], transform_skip_flag [x0][y0][1] and transform skip flag[x0][y0][2]) for three components, Y, Cb and Cr, is disabled. In this case, video decoder 300 may parse the LFNST index and may apply an inverse LFNST. In other words, video encoder 200 may not signal an LFNST index (or flag) or apply an LFNST and video decoder 300 may infer the LFNST index (or flag) to be 0 and not apply an inverse LFNST if all three Y, Cb and Cr transform skip flags are enabled (e.g., all of transform skip flag[x0][y0][0], transform skip flag[x0][y0][1] and transform skip flag[x0][y0][2] are equal to 1).

In another alternative, video encoder 200 may generate and signal an LFNST index and apply an LFNST only if all available transform skip flags are disabled. In this case, video decoder 300 may parse the LFNST index and apply an inverse LFNST. For example, in the case where separate-tree (e.g., dual-tree) partition is used, the following rules may apply:

1) Video encoder 200 may generate and signal an LFNST index and apply an LFNST for the luma channel if the transform skip flag for the luma component, transform skip flag[x0][y0][0], is disabled. In this case, video decoder 300 may parse the LFNST index and apply an inverse LFNST. Video encoder 200 may not generate and signal an LFNST index (or flag) or apply an LFNST and video decoder 300 may infer the LFNST index (or flag) to be 0 and not apply an inverse LFNST if the transform skip flag for luma is enabled; and 2) Video encoder 200 may generate and signal an LFNST index and apply an LFNST for the chroma channel if both of the transform skip flags (transform skip flag[x0][y0][1] and transform skip flag[x0][y0][2]) for both chroma components, Cb and Cr, are disabled. In this case, video decoder 300 may parse the LFNST index and apply an inverse LFNST. In other words, video encoder 200 may not generate and signal an LFNST index (or flag) or apply an LFNST and video decoder 300 may infer the LFNST index (or flag) to be 0 and not apply an inverse LFNST if at least one of the Cb and Cr transform skip flags are enabled (e.g., at least one of transform skip flag[x0][y0][1] and transform skip flag [x0][y0][2] is equal to 1).

In another example, LFNST is normatively disabled for the chroma channel, when single tree partition mode is used. In other words, in single-tree mode, video encoder 200 or video decoder 300 may only use LFNST for luma components.

The following changes may be made to VVC Draft 7 in accordance with the techniques of this disclosure. Additions begin with <ADD> and end with </ADD>. Deletions, i.e., removal of text, begin with <DELETE> and end with </DELETE>:

In one example VVC Draft 7 may be changed as follows:
7.3.9.5 Coding Unit Syntax

```
LfnstDcOnly = 1
LfnstZeroOutSigCoeffFlag = 1
MtsZeroOutSigCoeffFlag = 1
transform_tree( x0, y0, cbWidth, cbHeight, treeType, chType )
lfnstWidth = ( treeType = =
DUAL_TREE_CHROMA ) ? cbWidth / Sub WidthC
    : ( ( IntraSubPartitionsSplitType = =
ISP_VER_SPLIT ) ? cbWidth /
        NumIntraSubPartitions : cbWidth )
lfnstHeight = ( treeType = =
DUAL_TREE_CHROMA ) ? cbHeight / SubHeightC
    : ( ( IntraSubPartitionsSplitType = =
ISP_HOR_SPLIT) ? cbHeight /
        NumIntraSubPartitions : cbHeight )
<ADD> LfnstTransformNotSkipFlag =
        treeType != DUAL_TREE_CHROMA ?
transform_skip_flag[ x0 ][ y0 ][ 0 ] = = 0
    : ( transform skip flag[ x0 ][ y0 ][ 1 ] = = 0 ||
transform_skip_flag[ x0 ][ y0 ][ 2 ] = = 0 ) </ADD>
    if( Min( lfnstWidth, lfnstHeight ) >= 4 && sps_lfnst_enabled_
    flag
== 1 &&
        CuPredMode[ chType ][ x0 ][ y0 ] = = MODE_INTRA &&
        <ADD> LfnstTransformNotSkipFlag </ADD> <DELETE>
```

```
transform_skip_flag[ x0 ][ y0 ][ 0 ] = = 0 </DELETE> &&
    ( treeType != DUAL_TREE_CHROMA || (
!intra_mip_flag[ x0 ][ y0 ] ||
        Min( lfnstWidth, lfnstHeight ) >= 16 ) ) &&
        Max( cbWidth, cbHeight) <= MaxTbSizeY) {
        if( ( IntraSubPartitionsSplitType != ISP_NO_SPLIT ||
LfnstDcOnly = = 0 ) &&
            LfnstZeroOutSigCoeffFlag = = 1 )
            lfnst_idx                                    ae(v)
}
```

In another example, changes may be made to VVC Draft 7 as follows:
7.3.9.5 Coding Unit Syntax

```
LfnstDcOnly = 1
LfnstZeroOutSigCoeffFlag = 1
MtsZeroOutSigCoeffFlag = 1
transform_tree( x0, y0, cbWidth, cbHeight, treeType, chType )
lfnstWidth = ( treeType = =
DUAL_TREE_CHROMA ) ? cbWidth / SubWidthC
    : ( ( IntraSubPartitionsSplitType = =
ISP_VER_SPLIT ) ? cbWidth /
        NumIntraSubPartitions : cbWidth )
lfnstHeight = ( treeType = =
DUAL_TREE_CHROMA ) ? cbHeight / SubHeightC
    : ( ( IntraSubPartitionsSplitType = =
ISP_HOR_SPLIT) ? cbHeight /
        NumIntraSubPartitions : cbHeight )
<ADD> LfnstTransformNotSkipFlag = treeType = =
SINGLE_TREE ?
    ( transform_skip_flag[ x0 ][ y0 ][ 0 ] = = 0 ||
transform_skip_flag[ x0 ][ y0 ][ 1 ] = = 0 ||
        transform_skip_flag[ x0 ][ y0 ][ 2 ] = = 0 ) :
    ( treeType != DUAL_TREE_CHROMA ?
transform_skip_flag[ x0 ][ y0 ][ 0 ] = = 0
    : ( transform_skip_flag[ x0 ][ y0 ][ 1 ] = = 0 ||
transform_skip_flag[ x0 ][ y0 ][ 2 ] = = 0 )) </ADD>
    if( Min( lfnstWidth, lfnstHeight ) >= 4 && sps_lfnst_enabled-
    _flag
== 1 &&
        CuPredMode[ chType ][ x0 ][ y0 ] = = MODE_INTRA &&
        <ADD> LfnstTransformNotSkipFlag </ADD> <DELETE>
transform_skip_flag[ x0 ][ y0 ][ 0 ] = = 0 </DELETE> &&
    ( treeType != DUAL_TREE_CHROMA || (
!intra_mip_flag[ x0 ][ y0 ] ||
        Min( lfnstWidth, lfnstHeight ) >= 16 ) ) &&
        Max( cbWidth, cbHeight ) <= MaxTbSizeY) {
        if( ( IntraSubPartitionsSplitType != ISP_NO_SPLIT ||
LfnstDcOnly = = 0 ) &&
            LfnstZeroOutSigCoeffFlag = = 1 )
            lfnst_idx                                    ae(v)
}
```

In some examples, the following conditions for encoding and decoding an LFNST index may apply:
1) LFNST is disabled for chroma coded blocks in single-tree partition mode. In this case, video encoder 200 may not generate and signal an LFNST index (or flag) or apply an LFNST for chroma coded blocks in single-tree partition mode and video decoder 300 may infer the LFNST index (or flag) to be 0 and not apply an inverse LFNST. This can be reflected in in VVC draft text as (where additions begin with <ADD> and end with </ADD>):

<ADD>o If treeType is equal to SINGLE_TREE, applyLfnstFlag=(lfnst_idx>0 && cIdx==0)? 1:0</ADD>
where LFNST is only applied for blocks in luma component (i.e., <ADD>cIdx==0</ADD>) and disabled for chroma components (i.e., not available for <ADD>cIdx>0</ADD>).
2) In single-tree partition mode, video encoder 200 may not generate and signal an LFNST index (or flag) or apply an LFNST when the luma transform skip flag is enabled. In such a case, video decoder 300 may infer the value of the LFNST index (or flag) to be 0 and not apply an inverse LFNST.

3) In separate-tree (dual-tree) mode, video encoder 200 may generate and signal an LFNST for luma and chroma channels separately according to the following: a) For the luma channel: video encoder 200 may not generate and signal an LFNST index (or flag) or apply an LFNST when the luma transform skip flag is enabled (in this case, video decoder 300 may not parse the LFNST index or apply an inverse LFNST); and b) For the chroma channel: video encoder 200 may not signal an LFNST index (or flag) or apply an LFNST if at least one of the transform skip flags for chroma components (Cb and Cr) is enabled (if set to 1). In this case, video decoder 300 may infer the LFNST index (or flag) to be 0. In other words, video encoder 200 may signal an LFNST index and apply an LFNST when both transform skip flags, for Cb and Cr chroma components, are disabled (if they are set to 0). In this case, video decoder 300 may parse the LFNST index and apply an inverse LFNST.

The above example may be reflected in the VVC Draft 7 text (Additions begin with <ADD> and end with </ADD>. Deletions, i.e., removal of text, begin with <DELETE> and end with </DELETE>.

7.3.9.5 Coding Unit Syntax

```
    LfnstDcOnly = 1
    LfnstZeroOutSigCoeffFlag = 1
    MtsZeroOutSigCoeffFlag = 1
    transform_tree( x0, y0, cbWidth, cbHeight, treeType,
       chType )
    lfnstWidth = ( treeType = =
DUAL_TREE_CHROMA ) ? cbWidth / SubWidthC
         : ( ( IntraSubPartitionsSplitType = =
ISP_VER_SPLIT ) ? cbWidth /
                NumIntraSubPartitions : cbWidth )
    lfnstHeight = ( treeType = =
DUAL_TREE_CHROMA ) ? cbHeight / SubHeightC
         : ( ( IntraSubPartitionsSplitType = =
ISP_HOR_SPLIT) ? cbHeight /
                NumIntraSubPartitions : cbHeight )
         <ADD> LfnstTransformNotSkipFlag = ( treeType !=
DUAL_TREE_CHROMA ?
             transform_skip_flag[ x0 ][ y0 ][ 0 ] = = 0 :
( transform_skip_flag[ x0 ][ y0 ][ 1 ] = = 0 &&
             transform_skip_flag[ x0 ][ y0 ][ 2 ] = = 0 )) </ADD>
         if( Min( lfnstWidth, lfnstHeight ) >= 4 &&
sps_lfnst_enabled_flag = = 1 &&
    CuPredMode[ chType ][ x0 ][ y0 ] = = MODE_INTRA &&
    <ADD> LfnstTransformNotSkipFlag = = 1</ADD> <DELETE>
transform_skip_flag[ x0 ][ y0 ][ 0 ] = = 0 </DELETE> &&
      ( treeType != DUAL_TREE_CHROMA || (
!intra_mip_flag[ x0 ][ y0 ] ||
        Min( lfnstWidth, lfnstHeight ) >= 16 ) ) &&
      Max( cbWidth, cbHeight ) <= MaxTbSizeY ) {
             if( ( IntraSubPartitionsSplitType != ISP_NO_SPLIT ||
LfnstDcOnly = = 0 ) &&
         LfnstZeroOutSigCoeffFlag = = 1 )
             lfnst_idx                                          e(v)
    }
```

8.7.3 Scaling Process for Transform Coefficients

The (nTbW)×(nTbH) array dz is set equal to the (nTbW)× (nTbH) array TransCoeffLevel[xTbY][yTbY][cIdx].

<ADD> The variable applyLfnstFlag is derived as follows:
If treeType is equal to SINGLE_TREE,
  applyLfnstFlag=(lfnst_idx>0 && cIdx==0)? 1:0
Otherwise,
  applyLfnstFlag=(lfnst_idx>0)? 1:0</ADD>

For the derivation of the scaled transform coefficients d[x][y] with x=0 . . . nTbW−1, y=0 . . . nTbH−1, the following applies:

The intermediate scaling factor m[x][y] is derived as follows:
If one or more of the following conditions are true, m[x][y] is set equal to 16:
sps_scaling_list_enabled_flag is equal to 0.
pic_scaling_list_present_flag is equal to 0.
transform_skip_flag[xTbY][yTbY][cIdx] is equal to 1.
scaling_matrix_for_lfnst_disabled_flag is equal to 1 and <ADD> applyLfnstFlag</ADD><DELETE> lfnst_idx [xTbY][yTbY]</DELETE> is not equal to 0.
Otherwise, the following applies:

8.7.4 Transformation Process for Scaled Transform Coefficients 8.7.4.1 General

Inputs to this process are:
a luma location (xTbY, yTbY) specifying the top-left sample of the current luma transform block relative to the top-left luma sample of the current picture,
a variable nTbW specifying the width of the current transform block,
a variable nTbH specifying the height of the current transform block,
a variable cIdx specifying the colour component of the current block,
an (nTbW)×(nTbH) array d[x][y] of scaled transform coefficients with x=0 . . . nTbW−1, y=0 . . . nTbH−1.

Output of this process is the (nTbW)×(nTbH) array res [x][y] of residual samples with x=0 . . . nTbW−1, y=0 . . . nTbH−1.

<ADD> The variable applyLfnstFlag is derived as follows:
If treeType is equal to SINGLE_TREE,
  applyLfnstFlag=(lfnst_idx>0 && cIdx==0)? 1:0
Otherwise,
  applyLfnstFlag=(lfnst_idx>0)? 1:0</ADD>

When <ADD> applyLfnstFlag is not equal to 0</ADD><DELETE> lfnst_idx[xTbY][yTbY] is not equal to 0 and both nTbW and nTbH are greater than or equal to 4</DELETE>, the following applies:

The variables predModeIntra, nLfnstOutSize, log 2Lfnst-Size, nLfnstSize, and nonZeroSize are derived as follows:

predModeIntra
(cIdx==0)? IntraPredModeY[xTbY][yTbY]: IntraPredModeC[xTbY][y TbY] (1149)

nLfnstOutSize=(nTbW>=8&&nTbH>=8)? 48:16 (1150)

log 2LfnstSize=(nTbW>=8 && nTbH>=8)? 3:2 (1151)

nLfnstSize=1<<log 2LfnstSize (1152)

nonZeroSize=((nTbW==4&&nTbH==4)||
  (nTbW==8&&nTbH==8))?8:16 (1153)

When intra_mip_flag[xTbY][yTbY] is equal to 1 and cIdx is equal to 0, predModeIntra is set equal to INTRA_PLANAR.

When predModeIntra is equal to either INTRA_LT_C-CLM, INTRA_L_CCLM, or INTRA_T_CCLM, predModeIntra is derived as follows:
If
  intra_mip_flag[xTbY+nTbW*SubWidthC/2][yTbY+nTbH*SubHeightC/2] is equal to 1, predModeIntra is set equal to INTRA_PLANAR.
Otherwise, if
  CuPredMode[0][xTbY+nTbW*SubWidthC/2][yTbY+nTbH*SubHeightC/2] is equal to MODE_IBC or MODE_PLT, predModeIntra is set equal to INTRA_DC.

Otherwise, predModeIntra is set equal to IntraPred-
ModeY[xTbY+nTbW*SubWidthC/2][yTbY+
nTbH*SubHeightC/2].

The wide angle intra prediction mode mapping process as specified in clause 8.4.5.2.6 is invoked with predModeIntra, nTbW, nTbH and cIdx as inputs, and the modified predModeIntra as output.

The values of the list u[x] with x=0 . . . nonZeroSize−1 are derived as follows:

$$xC=DiagScanOrder[2][2][x][0] \quad (1154)$$

$$yC=DiagScanOrder[2][2][x][1] \quad (1155)$$

$$u[x]=d[xC][yC] \quad (1156)$$

The one-dimensional low frequency non-separable transformation process as specified in clause 8.7.4.2 is invoked with the input length of the scaled transform coefficients nonZeroSize, the transform output length nTrS set equal to nLfnstOutSize, the list of scaled non-zero transform coefficients u[x] with x=0 . . . nonZeroSize−1, and the intra prediction mode for LFNST set selection predModeIntra as inputs, and the list v[x] with x=0 . . . nLfnstOutSize−1 as output.

The array d[x][y] with x=0 . . . nLfnstSize−1, y=0 . . . nLfnstSize 1 is derived as follows:

If predModeIntra is less than or equal to 34, the following applies:

$$d[x][y]=(y<4)?v[x+(y<<\log 2LfnstSize)]:((x<4)?v\\{} [32+x+((y-4)<<2)]:d[x][y]) \quad (1157)$$

Otherwise, the following applies:

$$d[x][y]=(x<4)?v[y+(x<<\log 2LfnstSize)]:((y<4)?v\\{} [32+y+((x-4)<<2)]:d[x][y]) \quad (1158)$$

The variable implicitMtsEnabled is derived as follows:
If sps_mts_enabled_flag is equal to 1 and one of the following conditions is true, implicitMtsEnabled is set equal to 1:
IntraSubPartitionsSplitType is not equal to ISP_NO_SPLIT
cu_sbt_flag is equal to 1 and Max(nTbW, nTbH) is less than or equal to 32
sps_explicit_mts_intra_enabled_flag is equal to 0 and CuPredMode[0][xTbY][yTbY] is equal to MODE_INTRA and <ADD> applyLfnstFlag</ADD> <DELETE> lfnst_idx[x0][y0]</DELETE> is equal to 0 and intra_mip_flag[x0][y0] is equal to 0
Otherwise, implicitMtsEnabled is set equal to 0.

The variable trTypeHor specifying the horizontal transform kernel and the variable trTypeVer specifying the vertical transform kernel are derived as follows:
If one or more of the following conditions is true, trTypeHor and trTypeVer are set equal to 0.
cIdx is greater than 0
IntraSubPartitionsSplitType is not equal to ISP_NO_SPLIT and <ADD> applyLfnstFlag</ADD>-<DELETE> lfnst_idx</DELETE> is not equal to 0
Otherwise, if implicitMtsEnabled is equal to 1, the following applies:
If cu_sbt_flag is equal to 1, trTypeHor and trTypeVer are specified in Table 38 depending on cu_sbt_horizontal_flag and cu_sbt_pos_flag.
Otherwise (cu_sbt_flag is equal to 0), trTypeHor and trTypeVer are derived as follows:

$$trTypeHor=(nTbW>=4\&\&nTbW<=16)?1:0 \quad (1159)$$

$$trTypeVer=(nTbH>=4\&\&nTbH<=16)?1:0 \quad (1160)$$

Otherwise, trTypeHor and trTypeVer are specified in Table 37 depending on mts_idx.

The variables nonZeroW and nonZeroH are derived as follows:
If <ADD> applyLfnstFlag</ADD><DELETE> lfnst_idx[xTbY][yTbY] is not equal to 0 and both nTbW and nTbH are greater than or equal to 4</DELETE> is not equal to 0, the following applies:

$$nonZeroW=(nTbW==4||nTbH==4)?4:8 \quad (1161)$$

$$nonZeroH=(nTbW==4||nTbH==4)?4:8 \quad (1162)$$

Otherwise, the following applies:

$$nonZeroW=Min(nTbW,(trTypeHor>0)?16:32) \quad (1163)$$

$$nonZeroH=Min(nTbH,(trTypeVer>0)?16:32) \quad (1164)$$

Figure 5:
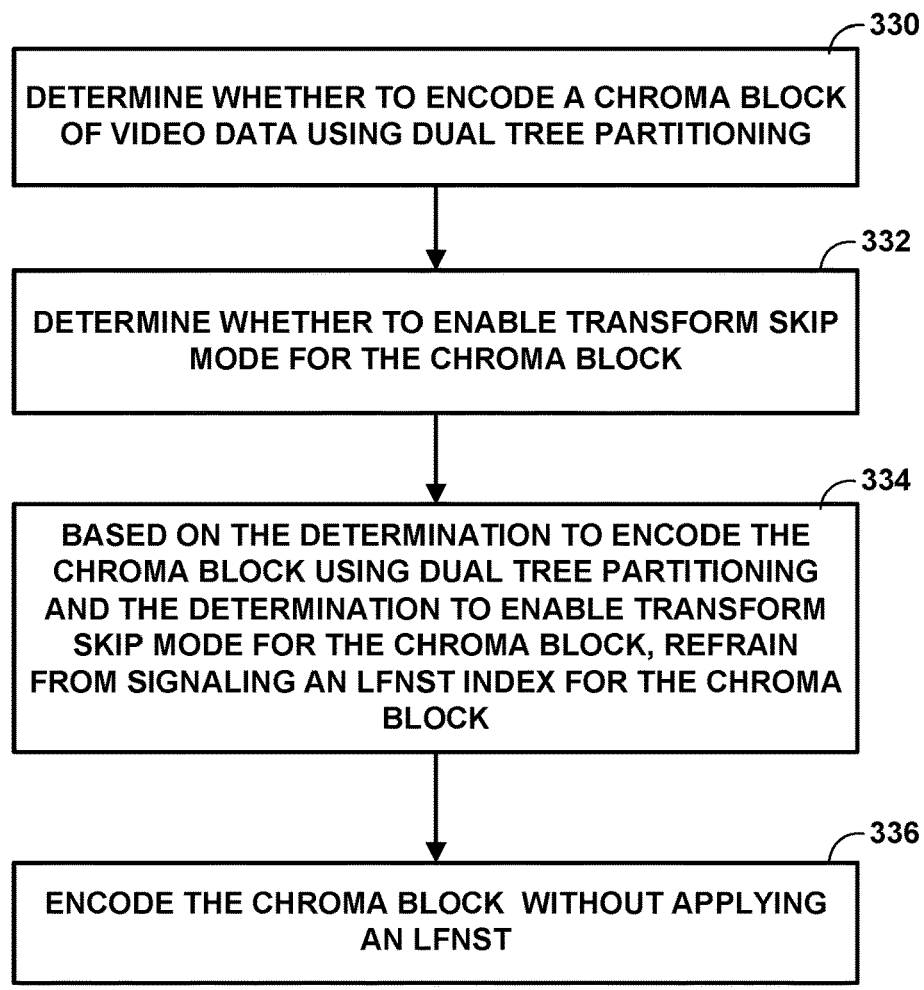
FIG. 5 is a flowchart illustrating an example technique for low-frequency non-separable transform (LFNST) encoding for chroma according to the techniques of this disclosure.

The (nTbW)×(nTbH) array r of residual samples is derived as follows:

FIG. 5 is a flowchart illustrating an example LFNST for chroma encoding techniques according to this disclosure. Video encoder 200 may determine whether to encode a chroma block of the video data using dual tree partitioning (330). The chroma block may be a Cb chroma block or a Cr chroma block. For example, video encoder 200 may perform different encoding passes with different partitioning of the video data and compare the results to determine whether to encode a Cb chroma block and/or a corresponding Cr chroma block using dual tree partitioning as discussed above with respect to the encoding parameters of the example of FIG. 3. Video encoder 200 may signal a syntax element in a bitstream indicative of whether the Cb chroma block and/or the corresponding Cr chroma block are encoded using dual tree partitioning. Video encoder 200 may determine whether to enable transform skip mode for the chroma block (332). For example, video encoder 200 may perform different encoding passes including enabling transform skip mode and disabling transform skip mode and compare the results to determine whether to enable transform skip mode for the Cb chroma block, or the Cr chroma block, or both the Cb chroma block and the Cr chroma block. Video encoder 200 may signal syntax elements in the bitstream indicative of whether to enable transform skip mode for the Cb chroma block, or the Cr chroma block, or both the Cb chroma block and the Cr chroma block.

Based on the determination to encode the chroma block using dual tree partitioning and the determination to enable transform skip mode for the chroma block, video encoder 200 may refrain from signaling an LFNST index for the chroma block (334). For example, video encoder 200 may not signal an LFNST index in the bitstream and video decoder 300 may not parse an LFNST index because LFNST may be disabled when at least one transform skip flag for the Cb chroma block or the Cr chroma block is enabled. Video encoder 200 may encode the chroma block without applying an LFNST (336). For example, transform processing unit 206 may not apply an LFNST to the chroma block.

In some examples, video encoder 200 may encode a corresponding another of the Cb chroma block or the Cr chroma block without transform processing unit 206 applying the LFNST. In other words, if the chroma block is a Cb chroma block, transform processing unit 206 may not apply the LFNST to a corresponding Cr chroma block and if the chroma block is a Cr chroma block, transform processing unit 206 may not apply the LFNST to a corresponding Cb chroma block.

In some examples, the chroma block is a first Cb chroma block or a first Cr chroma block and video encoder 200 may determine whether to encode a second Cb chroma block and a second Cr chroma block of the video data using dual tree partitioning. For example, video encoder 200 may perform different encoding passes with different partitioning of the video data and compare the results to determine whether to encode the second Cb chroma block and the second Cr chroma block using dual tree partitioning as discussed above with respect to the encoding parameters of the example of FIG. 3. Video encoder 200 may signal a syntax element in a bitstream indicative of whether the second Cb chroma block and the second Cr chroma block are encoded using dual tree partitioning.

In some examples, video encoder 200 may determine whether to enable transform skip mode for either the second Cb chroma block, or the second Cr chroma block, or both the second Cb chroma block and the second Cr chroma block. For example, video encoder 200 may perform different encoding passes including enabling transform skip mode and disabling transform skip mode and compare the results to determine whether to enable transform skip mode for the second Cb chroma block, or the second Cr chroma block, or both the second Cb chroma block and the second Cr chroma block. Video encoder 200 may signal syntax elements in the bitstream indicative of whether to enable transform skip mode for the second Cb chroma block, or the second Cr chroma block, or both the second Cb chroma block and the second Cr chroma block. Based at least in part on the determination to encode the second Cb chroma block and the second Cr chroma block using dual tree partitioning and the determination not to enable transform skip mode both the second Cb chroma block and the second Cr chroma block, video encoder 200 may signal an LFNST index for the second Cb chroma block and the second Cr chroma block. Video encoder 200 may encode the second Cb chroma block and the second Cr chroma block applying an LFNST in accordance with the LFNST index. For example, transform processing unit 206 may apply an LFNST to the second Cb chroma block and the second Cr chroma block.

In some examples, the chroma block is a first Cb chroma block or a first Cr chroma block, and video encoder 200 may determine whether to encode a second Cb chroma block and a second Cr chroma block of the video data using single tree partitioning. For example, video encoder 200 may perform different encoding passes with different partitioning of the video data and compare the results to determine whether to encode the second Cb chroma block and the second Cr chroma block using dual tree partitioning as discussed above with respect to the encoding parameters of the example of FIG. 3. Based on the determination to encode the second Cb chroma block and the second Cr chroma block using single tree partitioning, video encoder 200 may refrain from signaling an LFNST index. For example, LFNST may be normatively disabled for chroma blocks using single tree partitioning so there may be no need to signal an LFNST index. Video encoder 200 may encode the second Cb chroma block and the second Cr chroma block without applying an LFNST. For example, transform processing unit 206 may not apply an LFNST to the second Cb chroma block or the second Cr chroma block.

In some examples, video encoder 200 may determine whether to encode a luma block of the video data using dual tree partitioning. For example, video encoder 200 may perform different encoding passes with different partitioning of the video data and compare the results to determine whether to encode the luma block using dual tree partitioning as discussed above with respect to the encoding parameters of the example of FIG. 3. Video encoder 200 may signal a syntax element in a bitstream indicative of whether the luma block is encoded using dual tree partitioning. Video encoder 200 may determine whether to enable transform skip mode for the luma block. For example, video encoder 200 may perform different encoding passes including enabling transform skip mode and disabling transform skip mode and compare the results to determine whether to enable transform skip mode for the luma block. Video encoder 200 may signal a syntax element indicative of whether transform skip mode is enabled for the luma block. Based on the determination to encode the luma block using dual tree partitioning and the determination to enable transform skip mode for the luma block, video encoder 200 may refrain from signaling an LFNST index for the luma block. Video encoder may encode the luma block without applying an LFNST. For example, transform processing unit 206 may not apply an LFNST to the luma block.

In some examples, video encoder 200 may determine whether to encode a luma block of the video data using dual tree partitioning. For example, video encoder 200 may perform different encoding passes with different partitioning of the video data and compare the results to determine whether to encode the luma block using dual tree partitioning as discussed above with respect to the encoding parameters of the example of FIG. 3. Video encoder 200 may signal a syntax element in a bitstream indicative of whether the luma block is encoded using dual tree partitioning. Video encoder 200 may determine whether to enable transform skip mode for the luma block. For example, video encoder 200 may perform different encoding passes including enabling transform skip mode and disabling transform skip mode and compare the results to determine whether to enable transform skip mode for the luma block. Video encoder 200 may signal a syntax element indicative of whether transform skip mode is enabled for the luma block. Based at least in part on the determination to encode the luma block using dual tree partitioning and the determination not to enable transform skip mode for the luma block, video encoder 200 may signal an LFNST index for the luma block. Video encoder 200 may encode the luma block applying an LFNST in accordance with the LFNST index. For example, transform processing unit 206 may apply an LFNST to the luma block.

In some examples, video encoder 200 may determine whether to encode a luma block of the video data using single tree partitioning. For example, video encoder 200 may perform different encoding passes with different partitioning of the video data and compare the results to determine whether to encode the luma block using single tree partitioning. Video encoder 200 may signal a syntax element in a bitstream indicative of whether the luma block is encoded using single tree partitioning. Video encoder 200 may determine whether to enable transform skip mode for the luma block. For example, video encoder 200 may perform different encoding passes including enabling transform skip mode and disabling transform skip mode and compare the results to determine whether to enable transform skip mode for the luma block. Video encoder 200 may signal a syntax element indicative of whether transform skip mode is enabled for the luma block. Based on the determination to encode the luma block using single tree partitioning and the determination to enable transform skip mode for the luma block, video encoder 200 may refrain from signaling an LFNST index for the luma block. Video encoder 200 may encode the luma block without applying an LFNST. For example, transform processing unit 206 may not apply an LFNST to the luma block.

In some examples, video encoder 200 may determine whether to encode a luma block of the video data using single tree partitioning. For example, video encoder 200 may perform different encoding passes with different partitioning of the video data and compare the results to determine whether to encode the luma block using single tree partitioning. Video encoder 200 may signal a syntax element in a bitstream indicative of whether the luma block is encoded using single tree partitioning. Video encoder 200 may determine whether to enable transform skip mode for the luma block. For example, video encoder 200 may perform different encoding passes including enabling transform skip mode and disabling transform skip mode and compare the results to determine whether to enable transform skip mode for the luma block. Video encoder 200 may signal a syntax element indicative of whether transform skip mode is enabled for the luma block. Based at least in part on the determination to encode the luma block using single tree partitioning and the determination not to enable transform skip mode for the luma block, video encoder 200 may signal an LFNST index for the luma block; and encode the luma block applying an LFNST in accordance with the LFNST index. For example, transform processing unit 206 may apply an LFNST to the luma block.

Figure 6:
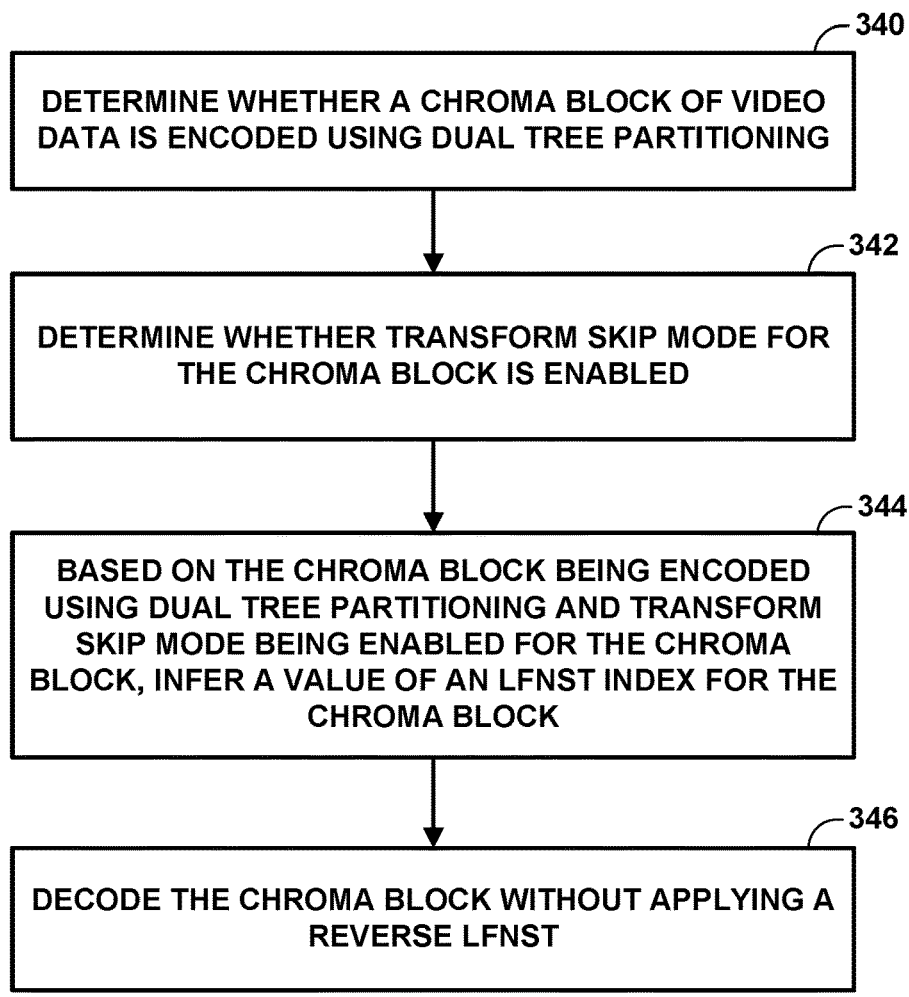
FIG. 6 is a flowchart illustrating an example technique for LFNST decoding for chroma according to the techniques of this disclosure.

FIG. 6 is a flowchart illustrating an example LFNST for chroma decoding techniques according to this disclosure. Video decoder 300 may determine whether a chroma block of the video data is encoded using dual tree partitioning (340). The chroma block may be a Cb chroma block or a Cr chroma block. For example, video decoder 300 may parse a syntax element in a bitstream indicative of whether the Cb chroma block and the Cr chroma block are encoded using dual tree partitioning. Video decoder 300 may determine whether transform skip mode for the chroma block is enabled (342). For example, video decoder 300 may parse a transform skip mode flag for the Cb chroma block and a transform skip mode flag for the Cr chroma block to determine whether transform skip mode for either the Cb chroma block, or the Cr chroma block, or both the Cb chroma block and the Cr chroma block is enabled.

Based on the chroma block being encoded using dual tree partitioning and transform skip mode being enabled for the chroma block, infer a value of an LFNST index for the chroma block (344). For example, video encoder 200 may not signal in a bitstream and video decoder 300 may not parse an LFNST index because LFNST may be disabled when at least one transform skip flag for the Cb chroma block or the Cr chroma block is enabled. Video decoder 300 may decode the chroma block without applying an inverse LFNST (346).

In some examples, video decoder 300 may decode a corresponding another of the Cb chroma block or the Cr chroma block without inverse transform processing unit 308 applying the inverse LFNST. In other words, if the chroma block is a Cb chroma block, inverse transform processing unit 308 may not apply the inverse LFNST to a corresponding Cr chroma block and if the chroma block is a Cr chroma block, inverse transform processing unit 308 may not apply the inverse LFNST to a corresponding Cb chroma block.

In some examples, the Cb chroma block is a first Cb chroma block or a first Cr chroma block, and video decoder 300 may determine whether a second Cb chroma block and a second Cr chroma block of the video data are encoded using dual tree partitioning. For example, video decoder 300 may parse a syntax element in a bitstream indicative of whether the second Cb chroma block and the second Cr chroma block are encoded using dual tree partitioning. Video decoder 300 may determine whether transform skip mode for either the second Cb chroma block, or the second Cr chroma block, or both the second Cb chroma block and the second Cr chroma block is enabled. For example, video decoder 300 may parse a transform skip mode flag for the second Cb chroma block and a transform skip mode flag for the second Cr chroma block to determine whether transform skip mode for either the second Cb chroma block, or the second Cr chroma block, or both the second Cb chroma block and the second Cr chroma block is enabled. Based at least in part on the second Cb chroma block and the second Cr chroma block being encoded using dual tree partitioning and transform skip mode not being enabled for both the second Cb chroma block and the second Cr chroma block, video decoder 300 may parse an LFNST index for the second Cb chroma block and the second Cr chroma block and decode the second Cb chroma block and the second Cr chroma block applying an inverse LFNST based on the based on the LFNST index. For example, inverse transform processing unit 308 may apply the inverse LFNST.

In some examples, video decoder 300 may determine whether a second Cb chroma block and a second Cr chroma block of the video data are encoded using single tree partitioning. For example, video decoder 300 may parse a syntax element in a bitstream indicative of whether the Cb chroma block and the Cr chroma block are encoded using single tree partitioning. Based on the second Cb chroma block and the second Cr chroma block being encoded using single tree partitioning, video decoder 300 may infer a value of an LFNST index. For example, video encoder 200 may not signal in a bitstream and video decoder 300 may not parse an LFNST index because LFNST may be disabled when the second Cb chroma block and the second Cr chroma block are encoded using single tree partitioning. Video decoder 300 may decode the second Cb chroma block and the second Cr chroma block without applying an inverse LFNST. For example, inverse transform processing unit 308 may not apply the inverse LFNST.

In some examples, video decoder 300 may determine whether a luma block of the video data is encoded using dual tree partitioning. For example, video decoder 300 may parse a syntax element in a bitstream indicative of whether the luma block is encoded using dual tree partitioning. Video decoder 300 may determine whether transform skip mode is enabled for the luma block. For example, video decoder 300 may parse a transform skip flag for the luma block to determine whether transform skip mode is enabled for the luma block. Based on the luma block being encoded using dual tree partitioning and the transform skip mode being enabled for the luma block, video decoder may infer a value of an LFNST index for the luma block and decode the luma block without applying an inverse LFNST. For example, inverse transform processing unit 308 may not apply the inverse LFNST.

In some examples, video decoder 300 may determine whether a luma block of the video data is encoded using dual tree partitioning. For example, video decoder 300 may parse a syntax element in a bitstream indicative of whether the luma block is encoded using dual tree partitioning. Video decoder 300 may determine whether transform skip mode is enabled for the luma block. For example, video decoder 300 may parse a transform skip flag for the luma block to determine whether transform skip mode is enabled for the luma block. Based at least in part on the luma block being encoded using dual tree partitioning and transform skip mode not being enabled for the luma block, video decoder 300 may parse an LFNST index for the luma block. Video decoder 300 may decode the luma block applying an inverse LFNST based on the LFNST index. For example, inverse transform processing unit 308 may apply the inverse LFNST.

In some examples, video decoder 300 may determine whether a luma block of the video data is encoded using single tree partitioning. For example, video decoder 300 may parse a syntax element in a bitstream indicative of whether the luma block is encoded using single tree partitioning. Video decoder 300 may determine whether transform skip mode is enabled for the luma block. For example, video decoder 300 may parse a transform skip flag for the luma block to determine whether transform skip mode is enabled for the luma block. Based on the luma block being encoded using single tree partitioning and the transform skip mode being enabled for the luma block, video decoder 300 may infer a value of an LFNST index for the luma block and decode the luma block without applying an inverse LFNST. For example, inverse transform processing unit 308 may not apply the inverse LFNST.

In some examples, video decoder 300 may determine whether a luma block of the video data is encoded using single tree partitioning. For example, video decoder 300 may parse a syntax element in a bitstream indicative of whether the luma block is encoded using single tree partitioning. Video decoder 300 may determine whether transform skip mode is enabled for the luma block. For example, video decoder 300 may parse a transform skip flag for the luma block to determine whether transform skip mode is enabled for the luma block. Based at least in part on the luma block being encoded using single tree partitioning and the transform skip mode not being enabled for the luma block, video decoder may parse an LFNST index for the luma block and decode the luma block using an LFNST based on the LFNST index. For example, inverse transform processing unit 308 may apply the inverse LFNST.

Figure 7:
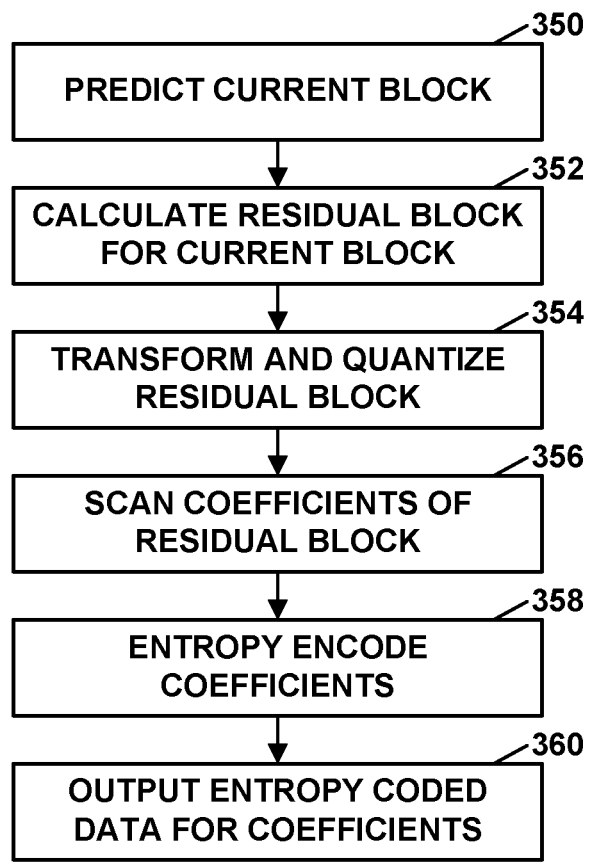
FIG. 7 is a flowchart illustrating an example method of encoding video data.

FIG. 7 is a flowchart illustrating an example method for encoding a current block. The current block may comprise a current CU. Although described with respect to video encoder 200 (FIGS. 1 and 3), it should be understood that other devices may be configured to perform a method similar to that of FIG. 7.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform and quantize coefficients of the residual block (354). For example, video encoder 200 may or may not generate and signal an LFNST index or apply an LFNST to the coefficients of the residual block according to the techniques of this disclosure. Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Figure 8:
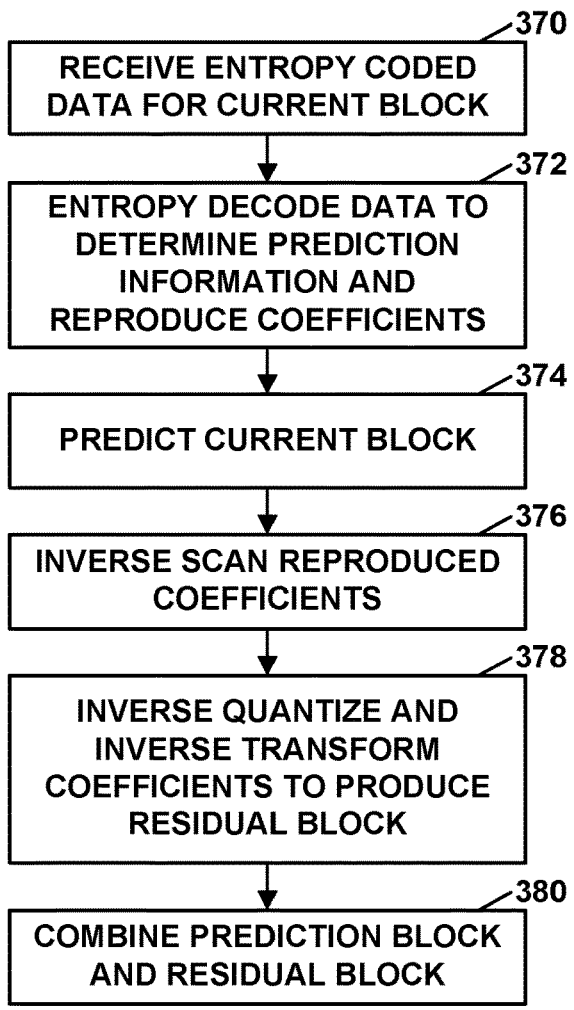
FIG. 8 is a flowchart illustrating an example method of decoding video data.

FIG. 8 is a flowchart illustrating an example method for decoding a current block of video data. The current block may comprise a current CU. Although described with respect to video decoder 300 (FIGS. 1 and 4), it should be understood that other devices may be configured to perform a method similar to that of FIG. 8.

Video decoder 300 may receive entropy encoded data for the current block, such as entropy encoded prediction information and entropy encoded data for coefficients of a residual block corresponding to the current block (370). Video decoder 300 may entropy decode the entropy encoded data to determine prediction information for the current block and to reproduce coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced coefficients (376), to create a block of quantized transform coefficients. Video decoder 300 may then inverse quantize and inverse transform the transform coefficients to produce a residual block (378). For example, video decoder 300 may or may not parse an LFNST index or apply an inverse LFNST according to the techniques of this disclosure. Video decoder 300 may ultimately decode the current block by combining the prediction block and the residual block (380).

According to the techniques of this disclosure, LFNST for chroma may not depend on a luma transform skip flag and LFNST indexes may not be signaled when LFNSTs are not used. The techniques of this disclosure may improve decoding latency and reduce signaling overhead.

This disclosure contains the following examples.

Clause 1. A method of encoding video data, the method comprising: determining a transform skip flag for luma; determining a first transform skip flag for chroma and a second transform skip flag for chroma; signaling a low frequency non-separable transform (LFNST) index for a luma channel based on the transform skip flag for luma being disabled and not signaling the LFNST index for the luma channel based on the transform skip flag for luma being enabled; signaling an LFNST index for a chroma channel if either of the first transform skip flag for chroma or the second transform skip flag for chroma are disabled or if both the first transform skip flag for chroma and the second transform skip flag for chroma are disabled and not signaling an LFNST index for the chroma channel based on both the first transform skip flag for chroma and the second transform skip flag for chroma being enabled; and encoding the current block of video data based on the transform skip flag for luma, the first transform skip flag for chroma, and the second transform skip flag for chroma.

Clause 2. The method of clause 1, further comprising applying dual-tree partitions to the current block of video data.

Clause 3. A method of decoding video data, the method comprising: determining a transform skip flag for luma; determining a first transform skip flag for chroma and a second transform skip flag for chroma; determining an LFNST index for a luma channel based on the transform skip flag for luma being disabled and inferring the LFNST index for the luma channel to be 0 based on the transform skip flag for luma being enabled; determining an LFNST index for a chroma channel if either of the first transform skip flag for chroma or the second transform skip flag for chroma are disabled or if both the first transform skip flag for chroma and the second transform skip flag for chroma are disabled and inferring the LFNST index for the chroma channel to be 0 based on both the first transform skip flag for chroma and the second transform skip flag for chroma being enabled; and decoding the current block of video data based on the transform skip flag for luma, the first transform skip flag for chroma, and the second transform skip flag for chroma.

Clause 4. The method of clause 3, further comprising applying dual-tree partitions to the current block of video data.

Clause 5. A method of encoding video data, the method comprising: determining a transform skip flag for luma; signaling an LFNST index for a luma channel based on the transform skip flag for luma being disabled and not signaling the LFNST index for the luma channel based on the transform skip flag for luma being enabled; and encoding the current block of video data based on the transform skip flag for luma.

Clause 6. The method of clause 5, further comprising applying single tree partitioning to the current block of video data.

Clause 7. A method of decoding video data, the method comprising: determining a transform skip flag for luma; determining an LFNST index for a luma channel based on the transform skip flag for luma being disabled and inferring the LFNST index for the luma channel to be 0 based on the transform skip flag for luma being enabled; and decoding the current block of video data based on the transform skip flag for luma.

Clause 8. The method of clause 7, further comprising applying single tree partitioning to the current block of video data.

Clause 9. A method of encoding video data, the method comprising: determining whether at least one of a transform skip flag for luma, a first transform skip flag for chroma, and a second transform skip flag for chroma are disabled; based upon at least one of the transform skip flag for luma, the first transform skip flag for chroma, and the second transform skip flag for chroma being disabled, signaling an LFNST index; and encoding the current block of video data based upon the LFNST index.

Clause 10. The method of clause 9, further comprising applying single tree partitioning to the current block of video data.

Clause 11. The method of any combination of clauses 9-10 further comprising; determining whether all of the transform skip flag for luma, the first transform skip flag for chroma, and the second transform skip flag for chroma are enabled; and based upon all of the transform skip flag for luma, the first transform skip flag for chroma, and the second transform skip flag for chroma being disabled, not signaling an LFNST index.

Clause 12. A method of decoding video data, the method comprising: determining whether at least one of a transform skip flag for luma, a first transform skip flag for chroma, and a second transform skip flag for chroma are disabled; based upon at least one of the transform skip flag for luma, the first transform skip flag for chroma, and the second transform skip flag for chroma being disabled, determining an LFNST index; and decoding the current block of video data based upon the transform skip flag for luma, the first transform skip flag for chroma, and the second transform skip flag for chroma.

Clause 13. The method of clause 12, further comprising applying single tree partitioning to the current block of video data.

Clause 14. The method of any combination of clauses 12-13, further comprising; determining whether all of the transform skip flag for luma, the first transform skip flag for chroma, and the second transform skip flag for chroma are enabled; and based upon all of the transform skip flag for luma, the first transform skip flag for chroma, and the second transform skip flag for chroma being disabled, inferring an LFNST index to be 0.

Clause 15. A method of encoding video data, the method comprising: determining a transform skip flag for a luma; determining a first transform skip flag for chroma and a second transform skip flag for chroma; signaling a low frequency non-separable transform (LFNST) index for a luma channel based on the transform skip flag for luma being disabled or not signaling the LFNST index for the luma channel based on the transform skip flag for luma being enabled; signaling an LFNST index for a chroma channel if both the first transform skip flag for chroma and the second transform skip flag for chroma are disabled or not signaling an LFNST index for the chroma channel based on both the first transform skip flag for chroma and the second transform skip flag for chroma being enabled; and encoding the current block of video data based on the transform skip flag for luma, the first transform skip flag for chroma, and the second transform skip flag for chroma.

Clause 16. A method for decoding video data, the method comprising: determining a transform skip flag for luma; determining a first transform skip flag for chroma and a second transform skip flag for chroma; determining an LFNST index for a luma channel based on the transform skip flag for luma being disabled or inferring the LFNST index for the luma channel to be 0 based on the transform skip flag for luma being enabled; determining an LFNST index for a chroma channel if both the first transform skip flag for chroma and the second transform skip flag for chroma are disabled or inferring the LFNST index to be 0 if one or more of the first transform skip flag for chroma or the second transform skip flag for chroma are enabled; and decoding the current block of video data based on the transform skip flag for luma, the first transform skip flag for chroma, and the second transform skip flag for chroma.

Clause 17. A method for coding video data, the method comprising: determining whether a coding mode for a current block of the video data is single-tree partition mode; based on the coding mode being single-tree partition mode, disabling LFNST for chroma channels; and coding the current block based on the coding mode and based on LFNST being disabled.

Clause 18. The method of clause 17, further comprising: determining whether a luma transform skip flag is enabled; and based on the luma transform skip flag being enabled, disabling LFNST for luma channels.

Clause 19. The method of clause 18, further comprising not signaling LFNST.

Clause 20. A device for coding video data, the device comprising one or more means for performing the method of any of clauses 1-19.

Clause 21. The device of clause 20, wherein the one or more means comprise one or more processors implemented in circuitry.

Clause 22. The device of any of clauses 20 and 21, further comprising a memory to store the video data.

Clause 23. The device of any of clauses 20-22, further comprising a display configured to display decoded video data.

Clause 24. The device of any of clauses 20-23, wherein the device comprises one or more of a camera, a computer, a mobile device, a broadcast receiver device, or a set-top box.

Clause 25. The device of any of clauses 20-24, wherein the device comprises a video decoder.

Clause 26. The device of any of clauses 20-25, wherein the device comprises a video encoder.

Clause 27. A computer-readable storage medium having stored thereon instructions that, when executed, cause one or more processors to perform the method of any of clauses 1-19.

Clause 28. A device for encoding video data, the device comprising: means for determining a transform skip flag for luma; means for determining a first transform skip flag for chroma and a second transform skip flag for chroma; means for signaling an LFNST index for a luma channel based on the transform skip flag for luma being disabled and not signaling the LFNST index for the luma channel based on the transform skip flag for luma being enabled; means for signaling an LFNST index for a chroma channel if either of the first transform skip flag for chroma or the second transform skip flag for chroma are disabled or if both the first transform skip flag for chroma and the second transform skip flag for chroma are disabled and not signaling an LFNST index for the chroma channel based on both the first transform skip flag for chroma and the second transform skip flag for chroma being enabled; and means for encoding the current block of video data based on the transform skip flag for luma, the first transform skip flag for chroma, and the second transform skip flag for chroma.

Clause 29. A device for encoding video data, the device comprising: means for determining a transform skip flag for luma; means for signaling an LFNST index for a luma channel based on the transform skip flag for luma being disabled and not signaling the LFNST index for the luma channel based on the transform skip flag for luma being enabled; and means for encoding the current block of video data based on the transform skip flag for luma.

Clause 30. A device for encoding video data, the device comprising: means for determining whether at least one of a transform skip flag for luma, a first transform skip flag for chroma, and a second transform skip flag for chroma are disabled; means for signaling an LFNST index based upon at least one of the transform skip flag for luma, the first transform skip flag for chroma, and the second transform skip flag for chroma being disabled; and means for encoding the current block of video data based upon the LFNST index.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following examples.

What is claimed is:

1. A method of decoding video data, the method comprising:
   determining whether a chroma block of the video data is encoded using dual tree partitioning;
   determining whether transform skip mode for the chroma block is enabled;
   in response to both the chroma block being encoded using dual tree partitioning and the transform skip mode being enabled for the chroma block, inferring a value of a low-frequency non-separable transform (LFNST) index for the chroma block; and decoding the chroma block without applying an inverse LFNST.

2. The method of claim 1, wherein the chroma block is one of a Cb chroma block or a Cr chroma block, further comprising:

decoding a corresponding another of the Cb chroma block or the Cr chroma block without applying the inverse LFNST.

3. The method of claim 1, wherein the chroma block is a first Cb chroma block or a first Cr chroma block, further comprising:

determining whether a second Cb chroma block and a second Cr chroma block of the video data are encoded using dual tree partitioning;

determining whether transform skip mode for either the second Cb chroma block, or the second Cr chroma block, or both the second Cb chroma block and the second Cr chroma block is enabled;

at least in part in response to the second Cb chroma block and the second Cr chroma block being encoded using dual tree partitioning and the transform skip mode not being enabled for both the second Cb chroma block and the second Cr chroma block, parsing an LFNST index for the second Cb chroma block and the second Cr chroma block; and decoding the second Cb chroma block and the second Cr chroma block applying an inverse LFNST based on the LFNST index.

4. The method of claim 1, wherein the chroma block is a first Cb chroma block or a first Cr chroma block, further comprising:

determining whether a second Cb chroma block and a second Cr chroma block of the video data are encoded using single tree partitioning;

in response to both the second Cb chroma block and the second Cr chroma block being encoded using single tree partitioning, inferring a value of an LFNST index; and decoding the second Cb chroma block and the second Cr chroma block without applying an inverse LFNST.

5. The method of claim 1, further comprising:

determining whether a luma block of the video data is encoded using dual tree partitioning;

determining whether transform skip mode is enabled for the luma block;

in response to both the luma block being encoded using dual tree partitioning and the transform skip mode being enabled for the luma block, inferring a value of an LFNST index for the luma block; and decoding the luma block without applying an inverse LFNST.

6. The method of claim 1, further comprising:

determining whether a luma block of the video data is encoded using dual tree partitioning;

determining whether transform skip mode is enabled for the luma block;

at least in part in response to both the luma block being encoded using dual tree partitioning and transform skip mode not being enabled for the luma block, parsing an LFNST index for the luma block; and decoding the luma block applying an inverse LFNST based on the LFNST index.

7. The method of claim 1, further comprising:

determining whether a luma block of the video data is encoded using single tree partitioning;

determining whether transform skip mode is enabled for the luma block;

in response to both the luma block being encoded using single tree partitioning and the transform skip mode being enabled for the luma block, inferring a value of an LFNST index for the luma block; and decoding the luma block without applying an inverse LFNST.

8. The method of claim 1, further comprising:

determining whether a luma block of the video data is encoded using single tree partitioning;

determining whether transform skip mode is enabled for the luma block;

at least in part in response to both the luma block being encoded using single tree partitioning and the transform skip mode not being enabled for the luma block, parsing an LFNST index for the luma block; and decoding the luma block applying an inverse LFNST based on the LFNST index.

9. A device for decoding video data, the device comprising:

memory configured to store the video data; and one or more processors implemented in circuitry and being coupled to the memory, the one or more processors being configured to:

determine whether a chroma block of the video data is encoded using dual tree partitioning;

determine whether transform skip mode for the chroma block is enabled;

in response to both the chroma block being encoded using dual tree partitioning and transform skip mode being enabled for the chroma block, infer a value of a low-frequency non-separable transform (LFNST) index for the chroma block; and decode the chroma block without applying an inverse LFNST.

10. The device of claim 9, wherein the chroma block is one of a Cb chroma block or a Cr chroma block, and the one or more processors are further configured to:

decode a corresponding another of the Cb chroma block or the Cr chroma block without applying the inverse LFNST.

11. The device of claim 9, wherein the chroma block is a first Cb chroma block or a first Cr chroma block, and the one or more processors are further configured to:

determine whether a second Cb chroma block and a second Cr chroma block of the video data are encoded using dual tree partitioning;

determine whether transform skip mode for either the second Cb chroma block, or the second Cr chroma block, or both the second Cb chroma block and the second Cr chroma block is enabled;

at least in part in response to the second Cb chroma block and the second Cr chroma block being encoded using dual tree partitioning and transform skip mode not being enabled for both the second Cb chroma block and the second Cr chroma block, parse an LFNST index for the second Cb chroma block and the second Cr chroma block; and decode the second Cb chroma block and the second Cr chroma block applying an inverse LFNST based on the LFNST index.

12. The device of claim 9, wherein the chroma block is a first Cb chroma block or a first Cr chroma block, and the one or more processors are further configured to:

determine whether a second Cb chroma block and a second Cr chroma block of the video data are encoded using single tree partitioning;

in response to both the second Cb chroma block and the second Cr chroma block being encoded using single tree partitioning, infer a value of an LFNST index; and decode the second Cb chroma block and the second Cr chroma block without applying an inverse LFNST.

13. The device of claim 9, wherein the one or more processors are further configured to:

determine whether a luma block of the video data is encoded using dual tree partitioning;

determine whether transform skip mode is enabled for the luma block;

in response to both the luma block being encoded using dual tree partitioning and the transform skip mode being enabled for the luma block, inferring a value of an LFNST index for the luma block; and decode the luma block without applying an inverse LFNST.

14. The device of claim 9, wherein the one or more processors are further configured to:

determine whether a luma block of the video data is encoded using dual tree partitioning;

determine whether transform skip mode is enabled for the luma block;

at least in part in response to both the luma block being encoded using dual tree partitioning and transform skip mode not being enabled for the luma block, parse an LFNST index for the luma block; and decode the luma block applying an inverse LFNST based on the LFNST index.

15. The device of claim 9, further comprising:

determine whether a luma block of the video data is encoded using single tree partitioning;

determine whether transform skip mode is enabled for the luma block;

in response to both the luma block being encoded using single tree partitioning and the transform skip mode being enabled for the luma block, inferring a value of an LFNST index for the luma block; and decode the luma block without applying an inverse LFNST.

16. The device of claim 9, further comprising:

determine whether a luma block of the video data is encoded using single tree partitioning;

determine whether transform skip mode is enabled for the luma block;

at least in part in response to both the luma block being encoded using single tree partitioning and the transform skip mode not being enabled for the luma block, parse an LFNST index for the luma block; and decode the luma block applying an inverse LFNST.

17. The device of claim 9, further comprising:

a display, the display being coupled to the one or more processors and being configured to display decoded video data.

18. A non-transitory computer-readable storage medium storing instructions that, when executed, causes one or more processors to:

determine whether a chroma block of video data is encoded using dual tree partitioning;

determine whether transform skip mode for the chroma block is enabled;

in response to both the chroma block being encoded using dual tree partitioning and transform skip mode being enabled for the chroma block, inferring a value of a low-frequency non-separable transform (LFNST) index for the chroma block; and decode the chroma block without applying an inverse LFNST.

19. A device for decoding video data, the device comprising:

means for determining whether a chroma block of the video data is encoded using dual tree partitioning;

means for determining whether transform skip mode for the chroma block is enabled;

means for inferring a value of a low-frequency non-separable transform (LFNST) index for the chroma block in response to both the chroma block being encoded using dual tree partitioning and transform skip mode being enabled for the chroma block; and means for decoding the chroma block without applying an inverse LFNST.

20. A method of encoding video data, the method comprising:

determining whether to encode a chroma block of the video data using dual tree partitioning;

determining whether to enable transform skip mode for the chroma block;

in response to both the determination to encode the chroma block using dual tree partitioning and the determination to enable transform skip mode for the chroma block, refraining from signaling a low-frequency non-separable transform (LFNST) index for the chroma block; and encoding the chroma block without applying an LFNST.

21. The method of claim 20, wherein the chroma block is one of a Cb chroma block or a Cr chroma block, further comprising:

encoding a corresponding another of the Cb chroma block or the Cr chroma block without applying the LFNST.

22. The method of claim 20, wherein the chroma block is a first Cb chroma block or a first Cr chroma block, further comprising:

determining whether to encode a second Cb chroma block and a second Cr chroma block of the video data using dual tree partitioning;

determining whether to enable transform skip mode for either the second Cb chroma block, or the second Cr chroma block, or both the second Cb chroma block and the second Cr chroma block;

at least in part in response to the determination to encode the second Cb chroma block and the second Cr chroma block using dual tree partitioning and the determination not to enable transform skip mode both the second Cb chroma block and the second Cr chroma block, signaling an LFNST index for the second Cb chroma block and the second Cr chroma block; and encoding the second Cb chroma block and the second Cr chroma block applying an LFNST in accordance with the LFNST index.

23. The method of claim 20, wherein the chroma block is a first Cb chroma block or a first Cr chroma block, further comprising:

determining whether to encode a second Cb chroma block and a second Cr chroma block of the video data using single tree partitioning;

in response to both the determination to encode the second Cb chroma block and the second Cr chroma block using single tree partitioning, refraining from signaling an LFNST index; and encoding the second Cb chroma block and the second Cr chroma block without applying an LFNST.

24. The method of claim 20, further comprising:
  determining whether to encode a luma block of the video data using dual tree partitioning;
  determining whether to enable transform skip mode for the luma block;
  in response to both the determination to encode the luma block using dual tree partitioning and the determination to enable transform skip mode for the luma block, refraining from signaling an LFNST index for the luma block; and
  encoding the luma block without applying an LFNST.

25. The method of claim 20, further comprising:
  determining whether to encode a luma block of the video data using dual tree partitioning;
  determining whether to enable transform skip mode for the luma block;
  at least in part in response to both the determination to encode the luma block using dual tree partitioning and the determination not to enable transform skip mode for the luma block, signaling an LFNST index for the luma block; and
  encoding the luma block applying an LFNST in accordance with the LFNST index.

26. The method of claim 20, further comprising:
  determining whether to encode a luma block of the video data using single tree partitioning;
  determining whether to enable transform skip mode for the luma block;
  in response to both the determination to encode the luma block using single tree partitioning and the determination to enable transform skip mode for the luma block, refraining from signaling an LFNST index for the luma block; and
  encoding the luma block without applying an LFNST.

27. The method of claim 20, further comprising:
  determining whether to encode a luma block of the video data using single tree partitioning;
  determining whether to enable transform skip mode for the luma block;
  at least in part in response to both the determination to encode the luma block using single tree partitioning and the determination not to enable transform skip mode for the luma block, signaling an LFNST index for the luma block; and
  encoding the luma block applying an LFNST in accordance with the LFNST index.

28. A device for encoding video data, the device comprising:
  memory configured to store the video data; and
  one or more processors implemented in circuitry and being coupled to the memory, the one or more processors being configured to:
    determine whether to encode a chroma block of the video data using dual tree partitioning;
    determine whether to enable transform skip mode for the chroma block;
    in response to both the determination to encode the chroma block using dual tree partitioning and the determination to enable transform skip mode for the chroma block, refrain from signaling a low-frequency non-separable transform (LFNST) index for the chroma block; and
    encode the chroma block without applying an LFNST.

29. The device of claim 28, wherein the chroma block is one of a Cb chroma block or a Cr chroma block, and the one or more processors are further configured to:
  encode a corresponding another of the Cb chroma block or the Cr chroma block without applying the LFNST.

30. The device of claim 28, wherein the chroma block is a first Cb chroma block or a first Cr chroma block, and the one or more processors are further configured to:
  determine whether to encode a second Cb chroma block and a second Cr chroma block of the video data using dual tree partitioning;
  determine whether to enable transform skip mode for either the second Cb chroma block, or the second Cr chroma block, or both the second Cb chroma block and the second Cr chroma block;
  at least in part in response to the determination to encode the second Cb chroma block and the second Cr chroma block using dual tree partitioning and the determination not to enable transform skip mode both the second Cb chroma block and the second Cr chroma block, signal an LFNST index for the second Cb chroma block and the second Cr chroma block; and
  encode the second Cb chroma block and the second Cr chroma block applying an LFNST in accordance with the LFNST index.

31. The device of claim 28, wherein the chroma block is a first Cb chroma block or a first Cr chroma block, and the one or more processors are further configured to:
  determine whether to encode a second Cb chroma block and a second Cr chroma block of the video data using single tree partitioning;
  in response to both the determination to encode the second Cb chroma block and the second Cr chroma block using single tree partitioning, refrain from signaling an LFNST index; and
  encode the second Cb chroma block and the second Cr chroma block without applying an LFNST.

32. The device of claim 28, wherein the one or more processors are further configured to:
  determine whether to encode a luma block of the video data using dual tree partitioning;
  determine whether to enable transform skip mode for the luma block;
  in response to both the determination to encode the luma block using dual tree partitioning and the determination to enable transform skip mode for the luma block, refrain from signaling an LFNST index for the luma block; and
  encode the luma block without applying an LFNST.

33. The device of claim 28, wherein the one or more processors are further configured to:
  determine whether to encode a luma block of the video data using dual tree partitioning;
  determine whether to enable transform skip mode for the luma block;
  at least in part in response to both the determination to encode the luma block using dual tree partitioning and the determination not to enable transform skip mode for the luma block, signal an LFNST index for the luma block; and
  encode the luma block applying an LFNST in accordance with the LFNST index.

34. The device of claim 28, wherein the one or more processors are further configured to:
  determine whether to encode a luma block of the video data using single tree partitioning;
  determine whether to enable transform skip mode for the luma block;
  in response to both the determination to encode the luma block using single tree partitioning and the determination to enable transform skip mode for the luma block, refrain from signaling an LFNST index for the luma block; and encode the luma block without applying an LFNST.

35. The device of claim 28, wherein the one or more processors are further configured to:
  determine whether to encode a luma block of the video data using single tree partitioning;
  determine whether to enable transform skip mode for the luma block;
  at least in part in response to both the determination to encode the luma block using single tree partitioning and the determination not to enable transform skip mode for the luma block, signal an LFNST index for the luma block; and
  encode the luma block applying an LFNST in accordance with the LFNST index.

36. The device of claim 28, further comprising:
  a camera coupled to the one or more processors, the camera being configured to capture the video data.

37. A non-transitory computer-readable storage medium storing instructions that, when executed, causes one or more processors to:
  determine whether to encode a chroma block of video data using dual tree partitioning;
  determine whether to enable transform skip mode for the chroma block;
  in response to both the determination to encode the chroma block using dual tree partitioning and the determination to enable transform skip mode for the chroma block, refrain from signaling a low-frequency non-separable transform (LFNST) index for the chroma block; and
  encode the chroma block without applying an LFNST.

38. A device for encoding video data, the device comprising:
  means for determining whether to encode a chroma block of the video data using dual tree partitioning;
  means for determining whether to enable transform skip mode for the chroma block;
  means for refraining from signaling a low-frequency non-separable transform (LFNST) index for the chroma block in response to both the determination to encode the chroma block using dual tree partitioning and the determination to enable transform skip mode for the chroma block; and
  means for encoding the chroma block without applying an LFNST.

* * * * *